United States Patent [19]

Muramatsu et al.

[11] Patent Number: 5,539,445
[45] Date of Patent: Jul. 23, 1996

[54] IMAGE READING APPARATUS WITH DOCUMENT FEEDING MEANS FOR FEEDING A PLURALITY OF DOCUMENTS TO A PLANTEN

[75] Inventors: Hideo Muramatsu, Shinshiro; Munehiro Nakatani, Toyohashi; Akio Nakajima, Toyokawa, all of Japan

[73] Assignee: Minolta Camera Kabisha Kaisha, Osaka, Japan

[21] Appl. No.: 994,407

[22] Filed: Dec. 21, 1992

[30] Foreign Application Priority Data

Dec. 27, 1991 [JP] Japan ............................ 3-345948

[51] Int. Cl.⁶ ..................... B41J 2/435; B41J 2/385
[52] U.S. Cl. ................ 347/262; 347/264; 347/153; 355/308
[58] Field of Search .................... 358/296, 498; 355/308, 313, 316, 317, 319, 321, 309, 244; 271/265, 3, 3.1, 4; 346/134; 347/262, 264, 153

[56] References Cited

U.S. PATENT DOCUMENTS

| | | | |
|---|---|---|---|
| 4,727,401 | 2/1988 | Partilla et al. | 355/24 |
| 5,005,055 | 4/1991 | Matsuo et al. | 355/308 |
| 5,010,371 | 4/1991 | Matsuo et al. | 355/308 |

FOREIGN PATENT DOCUMENTS

| | | |
|---|---|---|
| 62-47264 | 2/1987 | Japan . |
| 03059621 | 4/1991 | Japan . |

Primary Examiner—Benjamin R. Fuller
Assistant Examiner—Raquel Yvette Gordon
Attorney, Agent, or Firm—Burns, Doane, Swecker & Mathis

[57] ABSTRACT

An image reading apparatus provided with a document feeder, and in which a plurality of originals are set on a platen glass and read in a single reading operation to obtain image data. The obtained image data are stored in an image memory. The number of originals which can be placed on the platen glass varies in accordance with the size of the originals to maximize the number of originals to be placed on the platen glass.

23 Claims, 36 Drawing Sheets

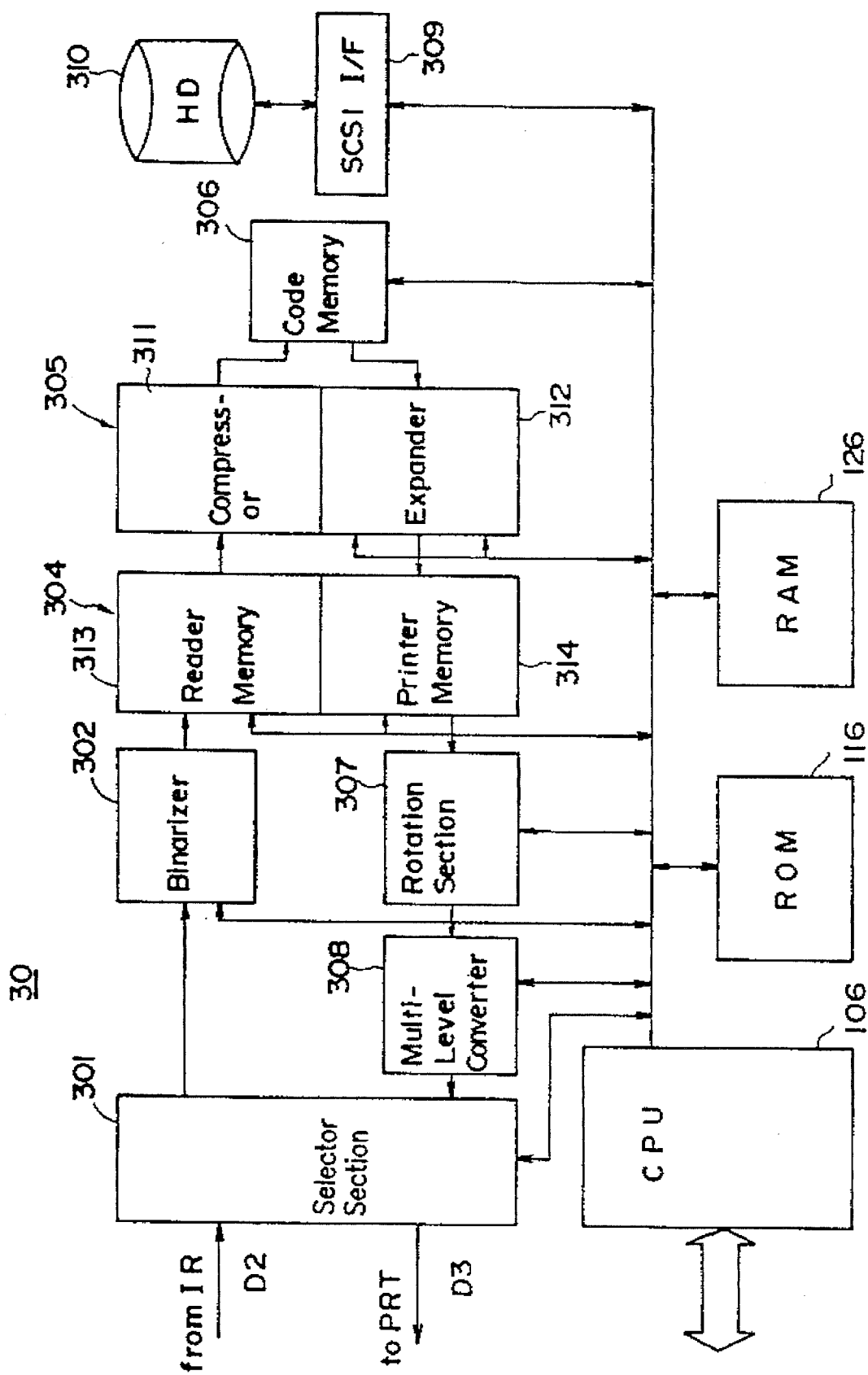

| | operation mode | | | |
|---|---|---|---|---|
| | Memory Mode | | Direct | Direct & Memory |
| Control Signal | Write | Read | | |
| SG1 | A | N | N | A |
| SG2 | N | N | A | A |
| SG3 | N | A | N | N |
| SG4 | A | X | A | A |
| SG5 | X | A | A | A |

A : Active  N : Non-Active
X : Active or Non-Active

| area | page | ante-connection | post-connection | additional |
|------|------|-----------------|-----------------|------------|
| 00 | 1 | 00 | 01 | |
| 01 | 1 | 01 | FF | |
| 02 | 2 | 00 | 03 | |
| 03 | 2 | 03 | FF | |
| ⋮ | | | | |

MTI

IMAGE READING APPARATUS WITH DOCUMENT FEEDING MEANS FOR FEEDING A PLURALITY OF DOCUMENTS TO A PLANTEN

BACKGROUND OF THE INVENTION

FIELD OF THE INVENTION

Conventional image reading apparatus are known to be provided with automatic document feeding devices to improve the efficiency of the original document reading operation. In the aforesaid type of apparatus, the document feeding device sets the original documents on a document platen one sheet at a time. The set original is read via a single scanning operation and the image data are generated. The aforesaid image data are stored in memory, or transmitted to a printing device to be printed on a recording sheet.

In image reading apparatus of the aforesaid type, only a single sheet of the original document can be placed on the document platen. Therefore, in order to read an original document comprising N sheets, the original feeding operation and the scanning operation must be performed N times, i.e., the same number as the number of originals, regardless of the size of said originals.

U.S. Pat. application Nos. 5,005,055 and 5,010,371 have proposed copying apparatus provided with a dual feeding mode for copying wherein two sheets of originals are set on the document platen and both sheets are read in a single scanning operation to improve copying efficiency. In the aforesaid copying apparatus, however, only two sheets of the original can be set on the document platen when the dual feeding mode is selected, even when the size of the originals are less than ⅓ the size of the document platen, i.e., even when the size of the original is such that three sheets can be set on the document platen.

SUMMARY OF THE INVENTION

An object of the present invention is to provide an image reading apparatus and method, and further provide an image forming apparatus which eliminate the previously described disadvantages.

Another object of the present invention is to provide an image reading apparatus and method for reading the images of a plurality of original documents with improved efficiency, and further provide an image forming apparatus for copying images of a plurality of original documents with improved efficiency.

A further object of the present invention is to provide an image reading apparatus and method and an image forming apparatus for setting an optimum number of sheets of an original document on the document platen in accordance with the size of the originals.

The aforesaid objects are achieved by providing the image reading apparatus and method and further providing the image forming apparatus of the present invention which determines the optimum number of sheets of an original document that can be set in accordance with the size of the originals, sets said optimum number of sheets of originals on the document platen, and reads said originals.

Other objects, characteristics and advantages of the present invention will become apparent from the following description of the preferred embodiments.

BRIEF DESCRIPTION OF THE DRAWINGS

FIG. 4 is a block diagram showing the memory unit section;

DESCRIPTION OF THE PREFERRED EMBODIMENTS

Figure 1:
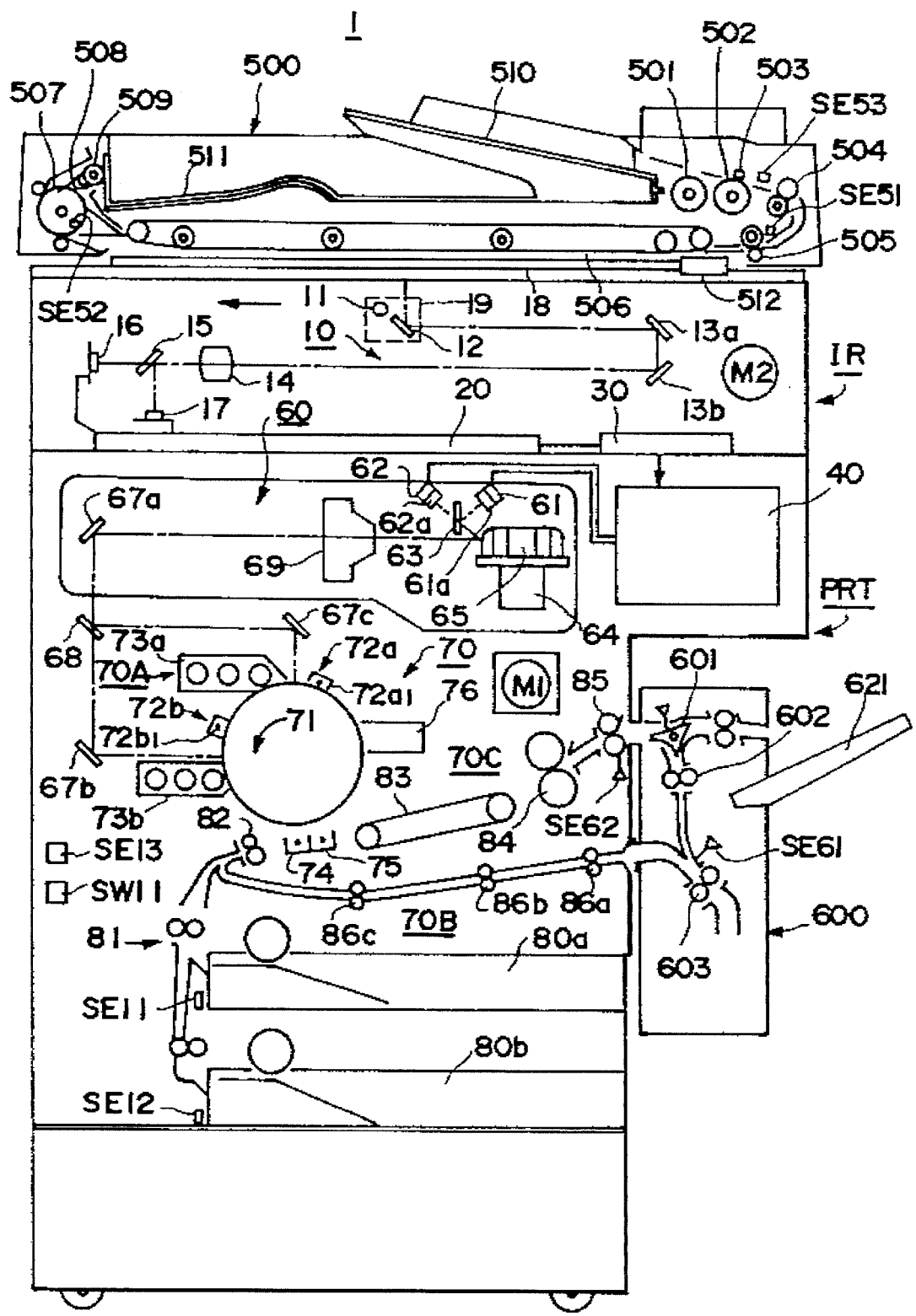
FIG. 1 is a front section view showing the general construction of a copying apparatus provided with an image reading apparatus.

FIG. 1 shows the general construction of the copying apparatus 1.

The copying apparatus 1 comprises a document feeder 500 for feeding originals to the document platen 18, scanning unit 10 for reading originals disposed on the document platen 18 and converting the read data to image signals, image signal processing section 20 for processing the image signals transmitted from said scanning unit 10, memory unit section 30 for switching the output of the image data input from the image data processing section 20 directly to the printer PRT or storing said image data in memory, print processing section 40 for driving the two semiconductor lasers 61 and 62 based on the image data input from said memory unit 30, optical unit 60 for guiding the two laser beams emitted from the respective semiconductor lasers 61 and 62 to mutually different locations on the surface of the photosensitive drum 71, image forming unit 70 for developing the latent images formed on the surface of the photosensitive drum 71 via light exposure, transferring said developed image onto a copy paper, and fixing said developed image on said copy paper, operation panel OP provided on the top of the main body of the copying apparatus, document feeder 500 for feeding original documents and inverting said original documents front-to-back as required, and refeeding section 600 for refeeding the copy paper a second time to the image transfer position.

The image reader IR comprises the document feeder section 500, scanning unit 10, image signal processing section 20 and the like. The printer PRT comprises the print processing section 40, optical unit 60, image forming unit 70 and the like.

The scanning unit 10 comprises an exposure lamp 11, first mirror 12, second and third mirrors 13a and 13b, collimating lens 14, dichroic mirror 15, photoelectric converter elements 16 and 17 using charge-couple device (CCD) array or the like, scanning motor M2 and the like.

The exposure lamp 11 and the first mirror 12 are mounted on the movable scanner 19 beneath the document platen 18. Furthermore, the second and third mirrors 13a and 13b are mounted on a separate movable scanner beneath the document platen 18.

The dichroic mirror 15 reflects light of a specific color, e.g., red or the like, which is reflected from the original document while transmitting the light of a specific complementary color. The photoelectric converting elements 16 and 17 convert the area of the original document image of non-specific color which is mainly black, and the area of the image of the specific color (red) to their respective individual electric signals.

The image signal processing section 20 processes the image signals output from the two photoelectric converter elements 16 and 17, discriminates the specified color (second color) and the other color (first color) of each pixel of the original document image, and outputs the color data attached to the image data to the memory unit section 30. The memory unit section 30 is described in detail later.

The print processing section 40 differentiates the transmitted image data with the attached color data so as to send said data in accordance with said differentiation to the two semiconductor lasers 61 and 62, and delays the image data output to the semiconductor laser 62.

The optical unit 60 comprises the semiconductor lasers 61 and 62, dichroic mirror 63 for combining the two laser beams, polygonal mirror 65 for deflecting the composite laser beam, main lens 69, reflecting mirror 67a, dichroic mirror 68 for separating the composite beam into the two original beams, reflecting mirrors 67b and 67c and the like.

The image forming unit 70 comprises a developing/transfer unit 70A, transport unit 70B, and fixing unit 70C.

The developing/transfer unit 70A comprises a photosensitive drum 71 which is rotatably driven in the counterclockwise direction in FIG. 1, and arranged sequentially in the clockwise direction around the periphery of said photosensitive drum 71 from the upstream side are a first charger 72a, first developing device 73a, second charger 72b, second developing device 73b, transfer charger 74, separation charger 75, and cleaning portion 76.

The aforesaid first developing device 73a accommodates a two-component developing material comprising a carrier and a red color toner corresponding to the aforesaid second color. The second developing device 73b accommodates a two-component developing material comprising a carrier and a black color toner corresponding to the aforesaid first color.

The transporting portion 70B comprises paper cassettes 80a and 80b, size detecting sensors SE11 and SE12 for detecting the size of the copy paper, paper guide 81, timing roller 82, transport belt 83, and horizontal transport rollers 86a, 86b and 86c for transporting the copy paper from the refeeding portion 600.

The fixing unit 70C comprises a pair of fixing rollers 84 for heat/pressure fixing of the image on the transported copy paper, discharge roller 85, and discharge sensor SE62 for detecting the discharge of the copy paper.

The refeeding portion 600 temporarily stores the copy paper discharged from the discharge roller 85, inverts the copy paper front-to-back when the duplex mode has been selected, or does not invert the copy paper front-to-back when the composite mode has been selected, and feeds the copy paper to the horizontal roller 86a of the transport unit 70B for another image forming operation (printing). The refeeding portion 600 comprises a switching member 601 for switching between a discharge position to discharge the copy paper to a discharge tray 621 and a refeed position to refeed the copy paper, transport roller 602, inverting roller 603, and inverting sensor SE61.

In the duplex mode, the left end of the switching member 601 is moved upwardly by means of a solenoid not shown in the drawings, so as to guide the copy paper discharged from the discharge roller 85 toward the transport roller 602. The copy paper then passes the transport roller 602 and arrives at the inverting roller 603.

When the trailing end of the copy paper arrives at the inverting sensor SE61, said copy paper is inverted by the inverting roller 603 and transported toward the horizontal transport roller 86a. The inverted copy paper passes the horizontal rollers 86a, 86b and 86c, and stops when it arrives at the timing roller 82. At this time, the next copy papers are pretransported at sequentially predetermined intervals. The number of sheets of single-sided copy paper that can stop at the timing roller is dependent upon the length of the copy paper when there is no delay of the image data.

The document feeding portion 500 automatically feeds the originals set on the document feed tray 510 onto the platen glass 18, and discharges said originals from the platen glass 18 to the discharge tray 511 after the image has been read by the scanner 19.

The document feeding portion 500 comprises a feed roller 501, pad 503, intermediate roller 504, register roller 505, transport belt 506, inverting roller 507, switching member 508, discharge roller 509, paper tray 510, discharge tray 511, document scale 512, register sensor (feed sensor) SE51, and discharge sensor SE52.

The operation of the document feeding portion 500 varies in accordance with the original reading mode. The original reading modes include scanning modes for reading an original via a scanning operation of the scanner 19, i.e., the scan one-side modes (hereinafter referred to as "one-side mode") and the scan duplex mode (hereinafter referred to as "duplex mode") depending on whether or not one side only or both sides of an original are to be read. Furthermore, the one-side modes include the normal one-side mode and an autoscan one-side mode (hereinafter referred to as "autoscan mode"), wherein a plurality of originals are read via a single scanning operation.

In the one-side mode, a single original or a plurality of originals are set on the tray 510 with the surface of the original to be read facing upward. When the operation starts, originals are fed sequentially from the lowermost portion of the stacked originals via the feed roller 501, and are transported via the roller 502 and pad 503 past the intermediate roller 504, and the inclination of the original is corrected by the register roller 505. The original is fed onto the platen glass 18 via the transport belt 506, and immediately after the trailing end of the original passes the left edge of the document scale 512, the transport belt is slightly reverse rotated, then stopped.

Thus, the right edge of the original (trailing end) abuts the edge of the document scale 512, and the original is properly positioned on the platen glass 18. At this time, the leading end of the next original has arrived at the register roller 505 so as to reduce the timer required to feed the next original.

In the aforesaid state, the scanner 19 reads the front side (bottom surface) of the original. When the original has been read, it is transported leftward via the transport belt 506, forms a U-turn via the inverting roller 507, passes over the switching member 508, and is discharged to the discharge tray 511 via the discharge roller 509. At this time, the original is discharged with the read surface of the original (front side) facing upward.

In the autoscan mode, the length Ld of the original is detected by the original sensor SE53 as the original is being fed. When the length Ld of the original is ½ or less of the effective length Lm of the platen glass 18 (effective length for reading originals), i.e., when the number of sheets of originals that can be set on the platen glass 18 is two or more (the number of settable sheets ECNT=INT(Lm/Ld)), the document feed control for the second and subsequent originals differ from the control of the previously described one-side mode.

That is, in the autoscan mode, immediately after the first original is past the register roller 505, said register roller 505 is stopped, the transport belt 506 is slightly reverse rotated, then stopped. Thus, the trailing end of the original remains in a state of contact with the stopped register roller 505. On the other hand, the second original is fed via the feed roller 501 and the like, such that the leading end of said second original comes into contact with the register roller 505, thereby forming a loop.

Thereafter, the aforesaid second original is continuously fed via the simultaneous operation of the document feed actuation of the intermediate roller 504, register roller 505, transport belt 506 and the like.

A number of original sheets equal to the calculated number of settable sheets ECNT described above are continuously fed via the aforesaid original feed control. Thereafter, the trailing end of the original on the last side contacts the edge of the document scale 512, and all of said originals are precisely positioned side by side on the platen glass 18 at the same time without spacing therebetween via the same positioning controls as in the previously described one-side mode (refer to FIG. 7).

In the aforesaid state, the scanner 19 scans the length of all the originals placed side-by-side on the platen glass 18 (overall length=Ld ×ECNT) in a single scanning operation, such that the front side of all the originals is read at once. When the originals have been read, said originals are transported in a leftward direction via the transport belt 506, past the inverting roller 507, and are discharged to the discharge tray 511.

The image data read via the scan by the scanner 19 is stored in the image memory 304 described later, and the page divisions are determined in accordance with the detected original length Ld so that said image data can be optionally sequentially read out of the image memory 304 in page units.

Therefore, the number of sheets of originals set on the platen glass 18 is controlled in accordance with the original length Ld. By reading in a single scanning operation a plurality of originals set on the platen glass 18, when several originals can be placed thereon at the same time, the time required for reading said originals is reduced, and the time required for transporting said originals is reduced, and, thus, the overall copying speed is improved when making in the one sided copies, duplex copies and book-style copies in the autoscan one-side mode.

In the duplex original mode, the front side of the original is read via the same controls as in the one-side mode; thereafter, the original is transported via the transport belt 506, and is inverted front-to-back by forming a U-turn via the inverting roller 507, and is again set on the platen glass 18. The back side of the original is then scanned via a scanning operation by the scanner 19.

Figure 2:
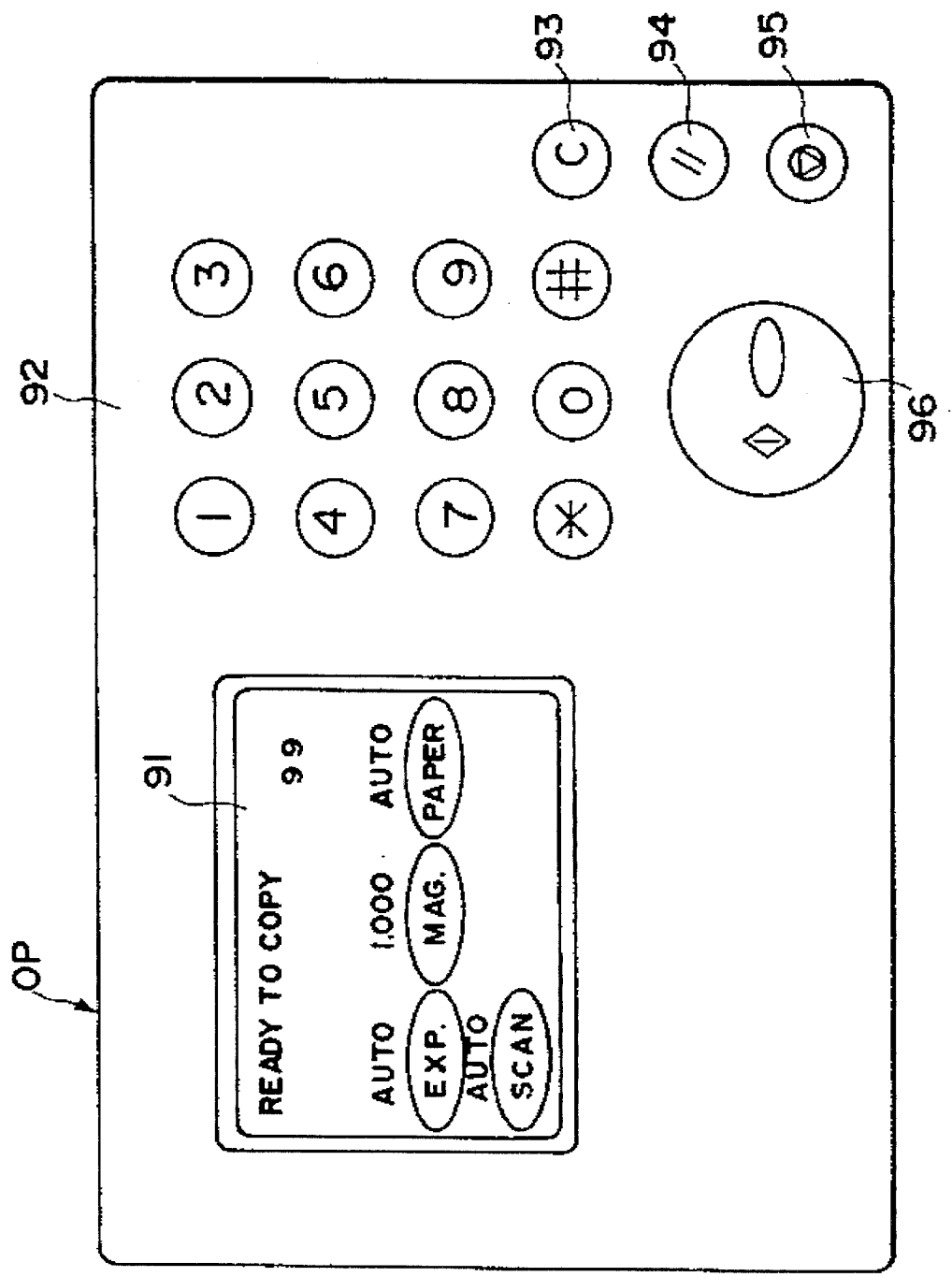
FIG. 2 is a front view showing the operation panel.

As shown in FIG. 2, the operation panel OP is provided with a liquid crystal touch panel 91, ten-key pad 92 for entering the copy set number and copy magnification, clear key 93 for returning the set number to a standard value of "1", panel reset key 94 for returning set value in the copying apparatus to standard values, stop key 95 for interrupting a copy operation, and start key 96 for starting a copy operation.

The liquid crystal touch panel 91 displays the various states of the copying apparatus 1 such as jam generation, service call generation, paper empty generation and the like, operation modes of the copying apparatus 1 such as exposure level, magnification, copy paper, autoscan mode and the like, display various other information, and is also used to input the selection of the operation mode.

The control portion 100 is described hereinafter.

Figure 3A:
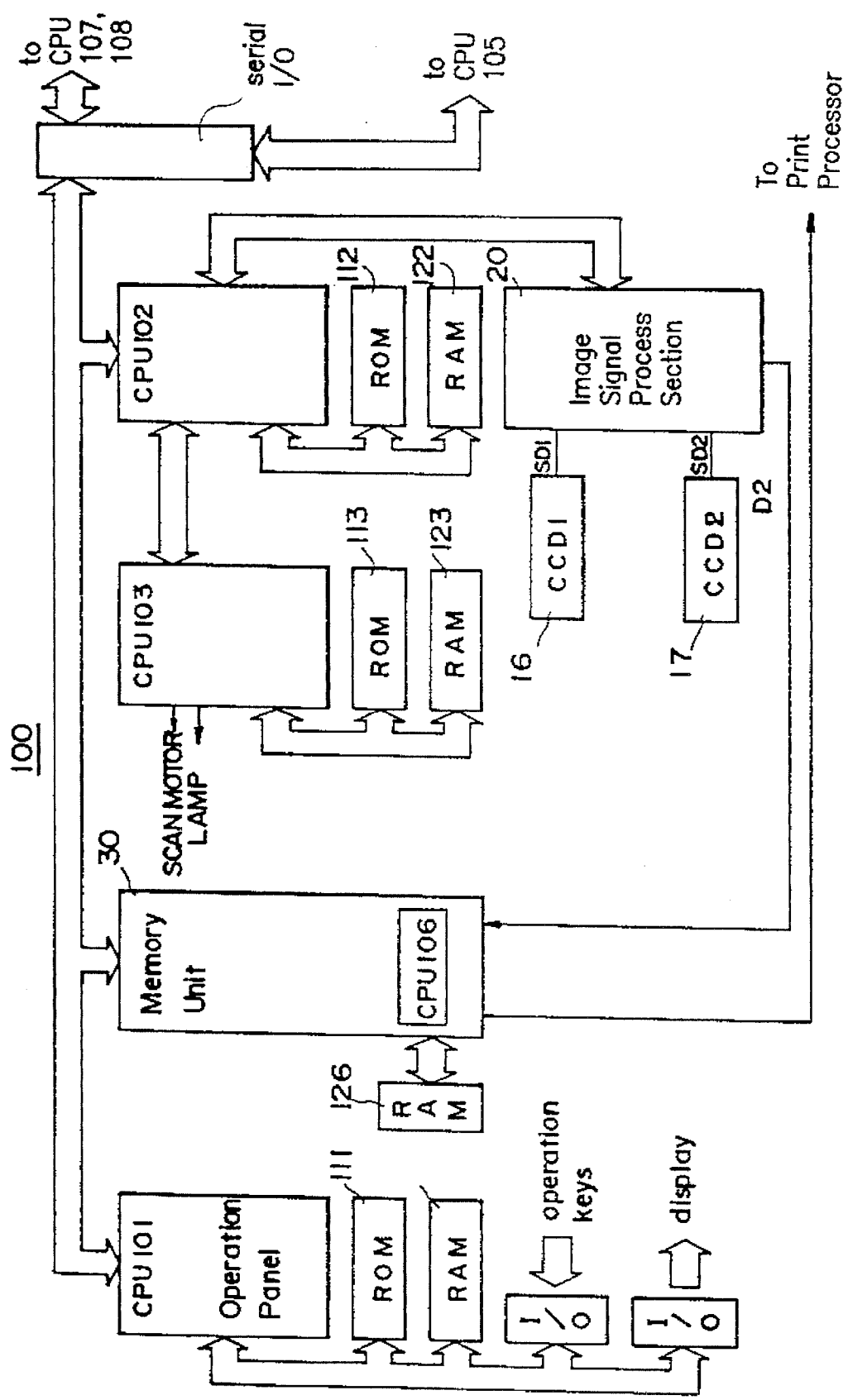
FIGS. 3a and 3b are block diagrams showing the construction of the control portion of the copying apparatus.
Figure 3B:
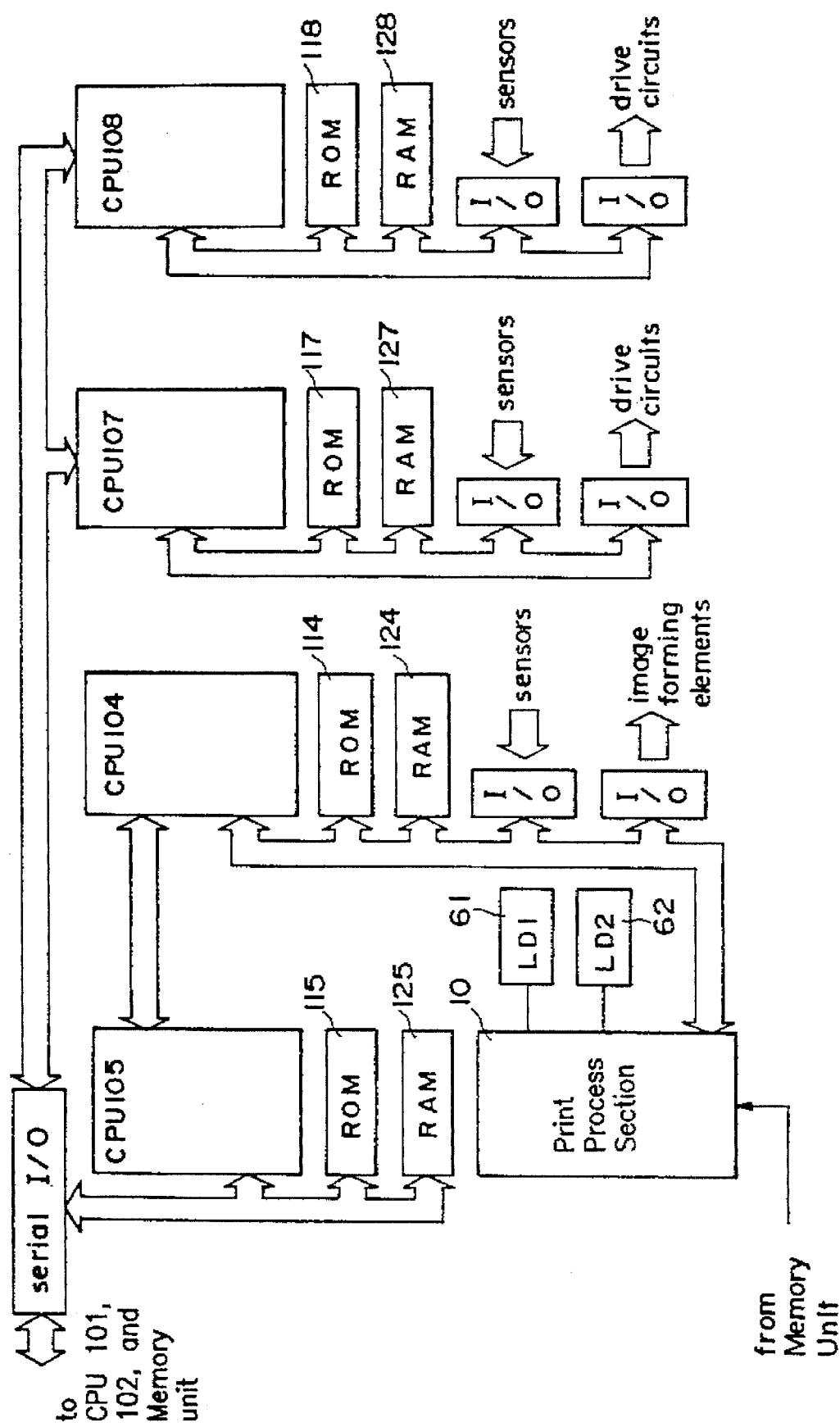

FIGS. 3a and 3b are block diagrams showing the construction of the control portion 100 of the copying apparatus 1.

The control portion 100 centrally comprises eight individual central processing units (CPU) 101–108. Each of the CPUs 101–108 are provided with read only memories (ROM) 111–118 for storing their respective programs, and random access memories (RAM) 121–128 provided with work areas for program execution. The CPU 106 is provided within the memory unit section 30.

The CPU 101 executes controls related to the displays and the input of signals from the various operation keys of the operation panel OP. The CPU 102 executes controls for each portion of the image signal process section 20. The CPU 103 controls the drive of the scanning unit 10. The CPU 104 controls the print process section 40, optical unit 60, and the image forming unit 70. The CPU 105 executes the processes to set operation mode and adjust the general timing of the control portion 100.

The CPU 106 temporarily stores the read image data into memory (image memory 304) via the control of the memory unit section 30, the stored image data are read, and output to the print processing section 40. Thus, the image reading device IR and the printing device PRT are independently controlled so as to improve the copying speed.

The CPU 107 controls the original document feeding portion 500, and the CPU 108 controls the refeeding portion 600. Serial communications among the aforesaid CPUs 101–108 are accomplished via interrupts, such that commands, reports and other data are exchanged.

The various processing sections for processing image data are described hereinafter.

The image signal processing section 20 comprises an analog-to-digital (A/D) converter, shading correction section, color discriminating section for discriminating the color of picture elements of the original based on the image data, variable magnification processing section, image quality correction section and the like.

The image signals input from the photoelectric converting elements 16 and 17 via the image signal processing section 20 are quantified as 8-bit image data for each pixel, and after the various processes are executed, the image data are output as image data D2. Furthermore, the 1-bit color data DC expressing whether or not the color is a specific color are output for each pixel of the image data D2.

The memory unit section 30 is described hereinafter.

FIG. 4 is a block diagram showing the memory unit section 30.

The memory unit section 30 comprises selector section 301, binarizer 302 for creating binary data based on the parameters settings from the CPU 106, multi-port image memory 304 provided with a capacity for two-page segments of A4 size at 400 dpi (dots per inch), encode section 305 provided with individually operable compressor 311 and expander 312, code memory 306 with multiple ports, rotation section 307, multi-level converter 308 for creating multi-level data (a plurality of bits per pixel) based on the parameter settings from the CPU 106, disk interface I/F (small computer systems interface SCSI-I/F) 309, hard disk 310, ROM 116, RAM 126, and a CPU 106 which executes the general control for the aforesaid image memory 304, code memory 306 and hard disk 310.

The image memory 304 is provided with a reader page memory 313 for storing the image data output from the image reader IR, and a printer page memory 314 to which is written the image data to be output to the printer PRT, each of said page memories being independently accessible. The compressor 311 and the expander 312 are mutually independent so as to be capable of parallel operation. Data are transmitted between the compressor 311, expander 312 and the code memory 306 by direct memory access (DMA) via a DMAC not shown in the drawings. The rotation section 307 selectively rotates the image at angles of 0°, 90°, 180°, or 270°.

Figures 5A, 5B:
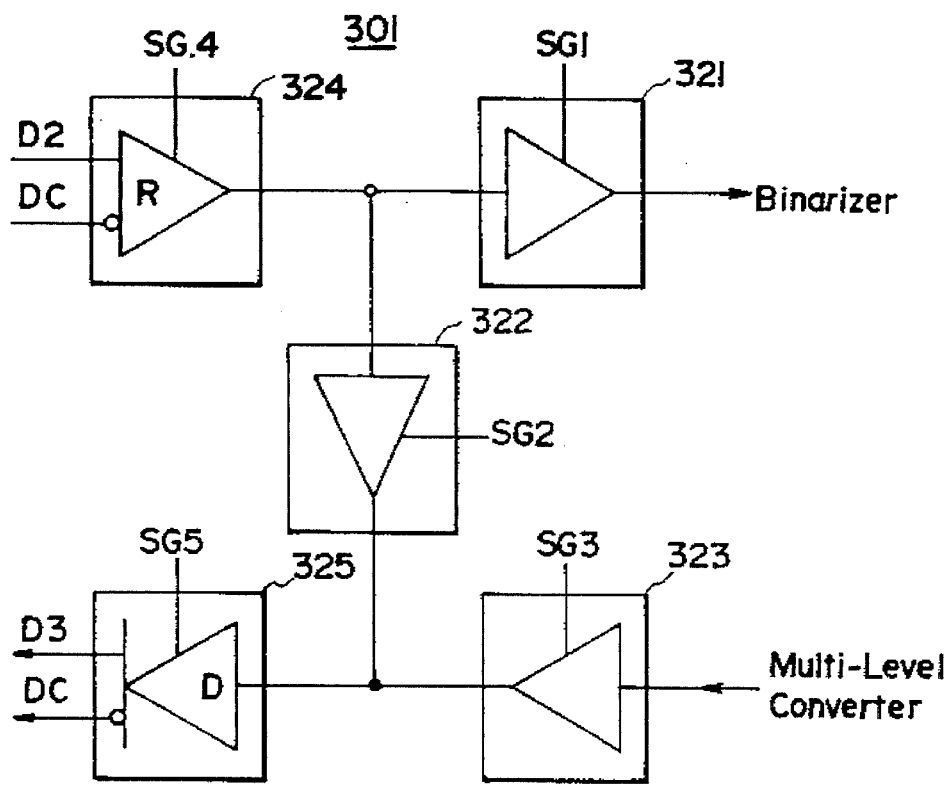
FIG. 5a is a block diagram showing the selector section of the memory unit.
FIG. 5b is an illustration showing the relationship between the control signals and the operation modes.

The selector section 301 comprises five bus gates 321–325, as shown in FIG. 5a. The ON (connect) and OFF (disconnect) states of these bus gates 321–325 are controlled by the control signals SG1–SG5. The control signals SG1–SG5 are switchable between active (A) and non-active (N) states in accordance with the operation mode. The image data flow is controlled via the combination of the aforesaid control signals SG1 through SG5. FIG. 5b shows the relationship of the various control signals and the operation modes.

When the image data D2 are written into the image memory 304, the compressor 311 reads and compresses said data to create compressed encoded data which are written to the code memory 306. The code data written to the code memory 306 are then written to the hard disk 310 through the disk I/F 309. The aforesaid process is repeated for each page segment of image data until all page data are written to the hard disk 310.

Whenever the image data D3 are output to the printer, the code data stored on the hard disk 310 are read out, and written to the code memory 306 via the disk I/F 309. The expander 312 reads and expands the code data written to the code memory 306 so as to produce image data which is written to the image memory 304.

When a one-page segment of image data are generated in the image memory 304 via the aforesaid expansion, said data are read and rotation processes as necessary in the rotation section 307. Multi-level image data are generated in the multi-level converter 308, and then are output as image data D3.

The code memory 306 manages the aforesaid processing via a management table MT1 stored in the RAM 126.

Figures 6A, 6B:
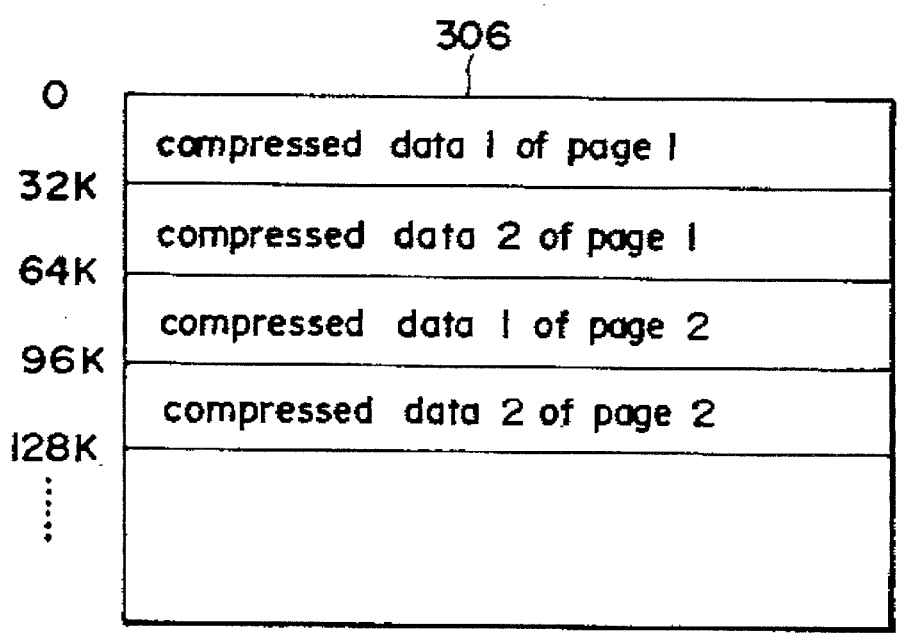
FIGS. 6a and 6b are illustrations showing the relationship between the management table and the code memory.

The code memory 306 is divided into memory areas of 32 kilobytes, as shown in FIG. 6b, which store the encoded data for each page, and are simultaneously controllable for writing in (when reading) and reading out (when printing).

As shown in FIG. 6a, the management table MT1 stores the various appended information required for the compression and expansion processes, e.g., the numbers expressing the areas of the code memory 306, page numbers, number of connected areas, compression method, data length and the like. The code memory 306 is dynamically managed in accordance with said appended information.

The CPU 106 generates the information contained by the management table MT1 each time the image data are read from the image memory 304 and compressed, controls the compressor 311, stores the data in the code memory 306, and transmits the data to the hard disk 310. Further more, when the image data are read out, said encoded data transmitted from the hard disk 310 are read from the code memory 306 via an opposite operation. The information contained in the management table MT1 is erased when all the required page information has been discharged normally.

Figure 7:
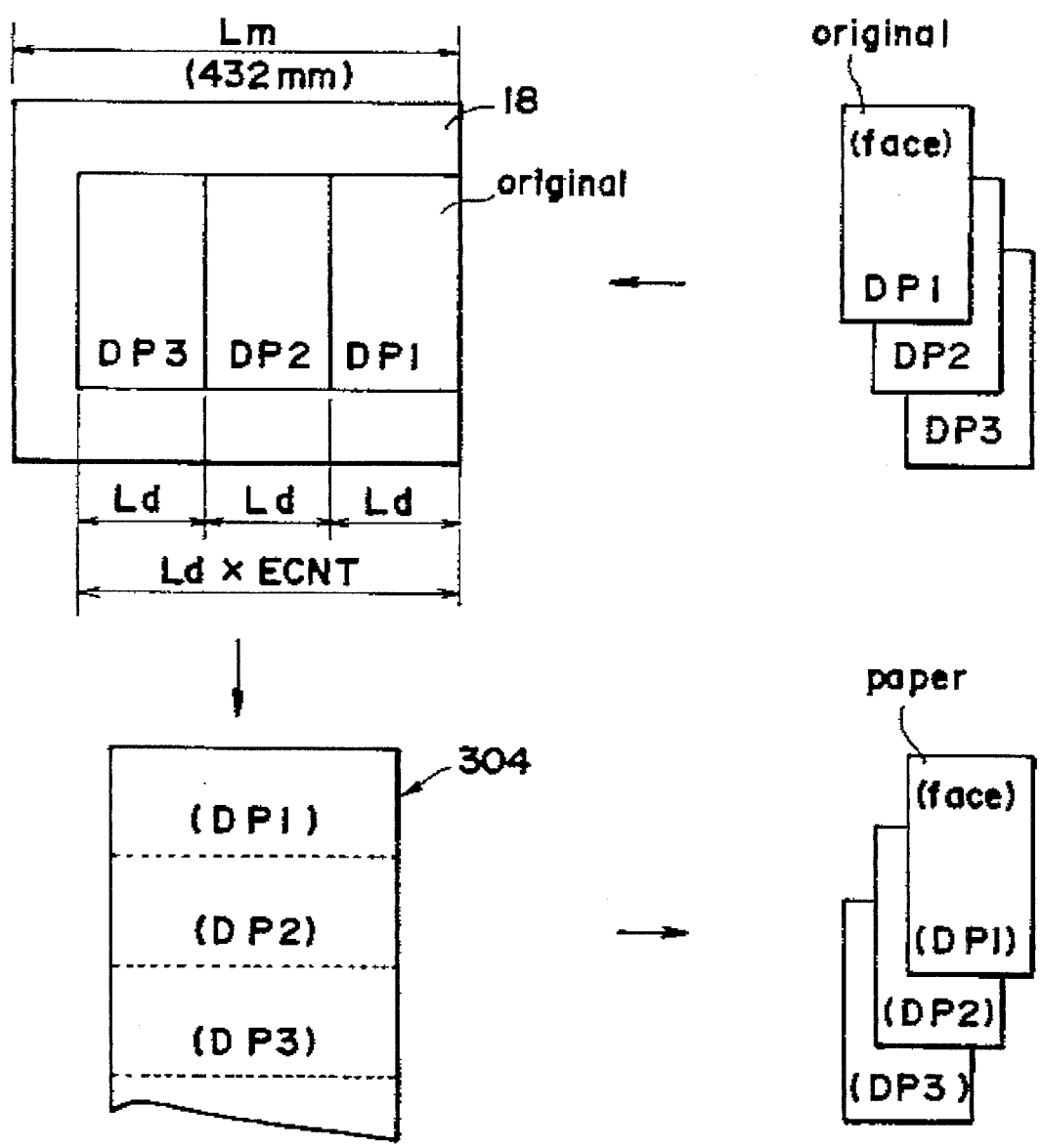
FIG. 7 is an illustration showing a brief example of the flow from the document reading in the auto-scan mode to the post-printing copy paper discharge in the normal mode.

FIG. 7 shows an example of the flow from the reading of the original in the autoscan mode to the discharge of the printed sheet in the normal mode.

The original documents DP1, DP2 and DP3 are set on the feed tray 510 in top-to-bottom sequence, and are fed therefrom via the document feeding portion 500 in the sequence DP3, DP2, DP1, so as to be placed side by side on the platen glass 18 in a right-to-left sequence (from the home position HP on the right side of the platen 18) DP1, DP2, DP3. The originals DP1, DP2 and DP3 read sequentially in a continuous reading operation via a single scan by the scanner 19, and the image data are stored in the same sequence in the image memory 304.

At this time, page end signals are generated at the reading end positions (left edge position of the originals) relative to each original DP1, DP2 and DP3 based on the detected original length Ld. Image data page management is accomplished by means of the aforesaid page end signals.

After the image data stored in the image memory 304 have been compressed, stored, expanded and the like, the last page DP3, then DP2 and finally DP1 are read sequentially from the image memory 304, printed in the aforesaid sequence on separate sheets, and discharged in the same order so as to be stacked one on top of another. Accordingly, the discharged printed three sheets are in the same order as the originals stacked on the document tray 510.

Thus, the image data is managed for each original, i.e., each page of the original. When printing, the page readout sequence from the image memory 304 can be optionally selected and is not restricted to sequence in which the image data were written to the image memory 304 when the original was scanned. Therefore, paper feed time is reduced and the copying speed is improved by reading out said image data in an optimum order in accordance with the copy mode.

The memory unit section 30 contains the operation modes, i.e., direct mode, memory mode, direct and memory (mix) mode. The memory mode includes two operation, i.e., the memory mode write operation and a memory mode read operation. The mix mode mixes the direct mode and the memory mode.

In the direct mode, the image data D2 output from the image signal processing section 20 are output directly to the print processing section 40 as image data D3. That is, in the direct mode, the bus gates 322, 324 and 325 of the selector section 301 are turned ON so that the bus of the image signal section 20 and the print section 40 are directly connected to directly output the image data D2 as the image data D3.

In the memory mode, the image data D2 are binarized, then fetched to the image memory 304 where predetermined processing is executed, and output as needed from the image memory 304 to the print processing section 40 as the image data D3.

That is, in the memory mode (from the reader to the memory), the bus gates 321 and 324 are turned ON and the image data D2 are output to the binarizer 302 while the memory mode writing operation is being executed. After binarization, the data are written to the image memory 304, compressed, written to the code memory 306, then are transmitted to the hard disk 310.

During the memory mode reading operation (from memory to the printer), the bus gates 323 and 325 are turned ON, the expanded image data transmitted from the image memory 304 are read, and output as image data D3.

In the mix mode, the bus gates 321, 322, 324, and 325 are turned ON, the image data D2 are output directly to the print processing section 40 as image data D3, and at the same time the image data D2 pass through the binarizer 302 and are written to the image memory 304.

The aforesaid operation modes of the memory unit section 30 are automatically selected in accordance with the copy mode. For example, the direct mode is selectable in the normal copy mode. In the multicopy mode for one-sided originals, the first original sheet is read in the mix mode, and the second and subsequent original sheets are read in the memory mode. Thus, the originals can be exchanged during the printing operation, and the overall throughput is improved.

Furthermore, in the multicopy mode for duplex originals, the reading of the back side of the original is accomplished in the memory mode, then the original is inverted front-to-back, and the back side of the original is accomplished via the direct mode. The back side of the original is printed via the memory mode operation. Thus, the original need be inverted only one time.

In the modes for making duplex copies of a plurality of sheets of duplex originals sheet by sheet, the mode is switched between the memory mode and direct mode after a suitable number of sheets. In the memory mode, the memory mode write operation and the memory mode read operation are executed in parallel at suitable intervals.

Examples of the relationship between the original reading operation and paper printing operation are described hereinafter.

Example 1 pertains to making a single copy on one-side of the copy sheets for two one-sided originals in the autoscan mode (one-side original one-side copy). The original length is less than ½ the effective reading length Lm.

Two sheets of originals are placed on the document tray 510 with the first sheet on top and the second sheet on the bottom (last sheet) so as to face upward. The originals are fed onto the platen glass 18 in the order of second sheet, first sheet, such that both originals are set at the reading position on the platen glass 18. Thereafter, both originals are scanned in a single scanning operation wherein the first original and the second original are sequentially read, and the first original image data are stored in memory unit section 30 and the second original image data are output directly to the printer PRT, and the printed first copy sheet is discharged. Next, the image data of the first original is read out from the memory unit section 30, and printed on a second copy sheet which is then discharged on top of the aforesaid first copy sheet.

Example two pertains to a single copy on both sides of the copy sheet of Example 1 (one-side original duplex copy).

In this case the process wherein both originals are read in a single scanning operation, until the second original is printed on the front side of the copy sheet is identical to that described in Example 1. Thereafter, the copy sheet is inverted front-to-back and re-fed, the image data of the first original is read out from the memory unit section 30 and printed on the back side of the same copy sheet.

Example 3 pertains to making multiple copies of two one-sided originals to one side of two copy sheets in the autoscan mode (one-side original one-side copy). The length of the originals is less than ½ the effective reading length Lm.

The two originals set on the document tray 510 are fed onto the platen glass 18 in the order of second original, first original such that both originals are placed side by side at the reading position on the platen glass 18. Then, the two originals are read sequentially in a single scanning operation and their respective image data are stored in the memory unit section 30.

The image data of the aforesaid two one-sided originals are readout from the memory unit section 30 in the sequence of second original, first original, second original, first original, the printing operations are executed such that the image data are respectively printed on copy sheets one through four which are then sequentially discharged.

Example 4 pertains to making multiple copies of the two one-sided originals of Example 3, wherein the length of the originals is more than ½ the effective reading length Lm. That is, the settable number of originals ECNT is [1], even in the autoscan mode.

First, the second original is fed onto the platen glass 18 and read in a single scanning operation, while at the same time the image data are printed on a first copy sheet and also stored in the memory unit section 30. Next, the first original is similarly set on the platen glass 18 and read in a single scanning operation, the image data are printed on a second copy sheet and also stored in the memory unit section 30.

Thereafter, the image data of the second original and the first original are sequentially read out from the memory unit section 30 and are printed on the third and fourth copy sheets, which are then sequentially discharged.

Example 5 pertains to making duplex copies of the two one-sided originals of Example 3.

In this case the process wherein both originals are read in a single scanning operation is identical to that described in Example 3. The image data of the read originals are stored in the memory unit section 30, and at the same time the image data of the second original is printed on the front side of the first copy sheet.

Then, the first copy sheet is inverted front-to-back and fed again such that the image data of the first original is read out from the memory unit section 30 and printed on the back side of the same copy sheet. The image data of the second original is then read out from the memory unit section 30 and printed on the front side of the second copy sheet. The second copy sheet is then inverted front-to-back and fed again such that the image data of the first original is read out from the memory unit section 30 and printed on the back side of the second copy sheet.

Example 6 pertains to making a single composite copy of two one-sided originals on one side of a copy sheet using the two-in-one mode, wherein the length of the originals is less than ½ of the effective reading length.

Both originals are set on the platen glass 18 and read in a single scanning operation. At the same time the image data are respectively printed to the first half and latter half of a single copy sheet.

Example 7 pertains to making multiple copies on two copy sheets using the two-one-sided originals of Example 6.

Both originals are read and their respective image data are printed on the first half and latter half of a single copy sheet in the same manner as described in Example 6. At the same time the aforesaid printing is being accomplished, the image data of both originals are stored in the memory unit section 30, and thereafter read out from said memory unit section 30 so as to be printed on the first half and latter half of a second copy sheet.

Thus, the operation mode of the memory unit section 30 is selected in accordance with the copy mode such that the operation modes are switchable within the same copy mode. Furthermore, the copying speed is improved and the usefulness of the copying apparatus is improved by executing two operations in parallel.

In the memory mode and the direct/memory mode, the image data D2 are binarized, compressed, and stored in the code memory 306, such that the maximum amount of image data occupies the minimum amount of memory. However, the image data also may be directly stored in memory without binarization or compression.

The general operating sequences of the copying apparatus 1 are described hereinafter for each operation mode, said discussion focusing on request commands (Q), reports (A) and data flow transmitted among the various CPUs 101–106. In the drawings discussed below, unnecessary commands and reports have been omitted.

Figure 8:
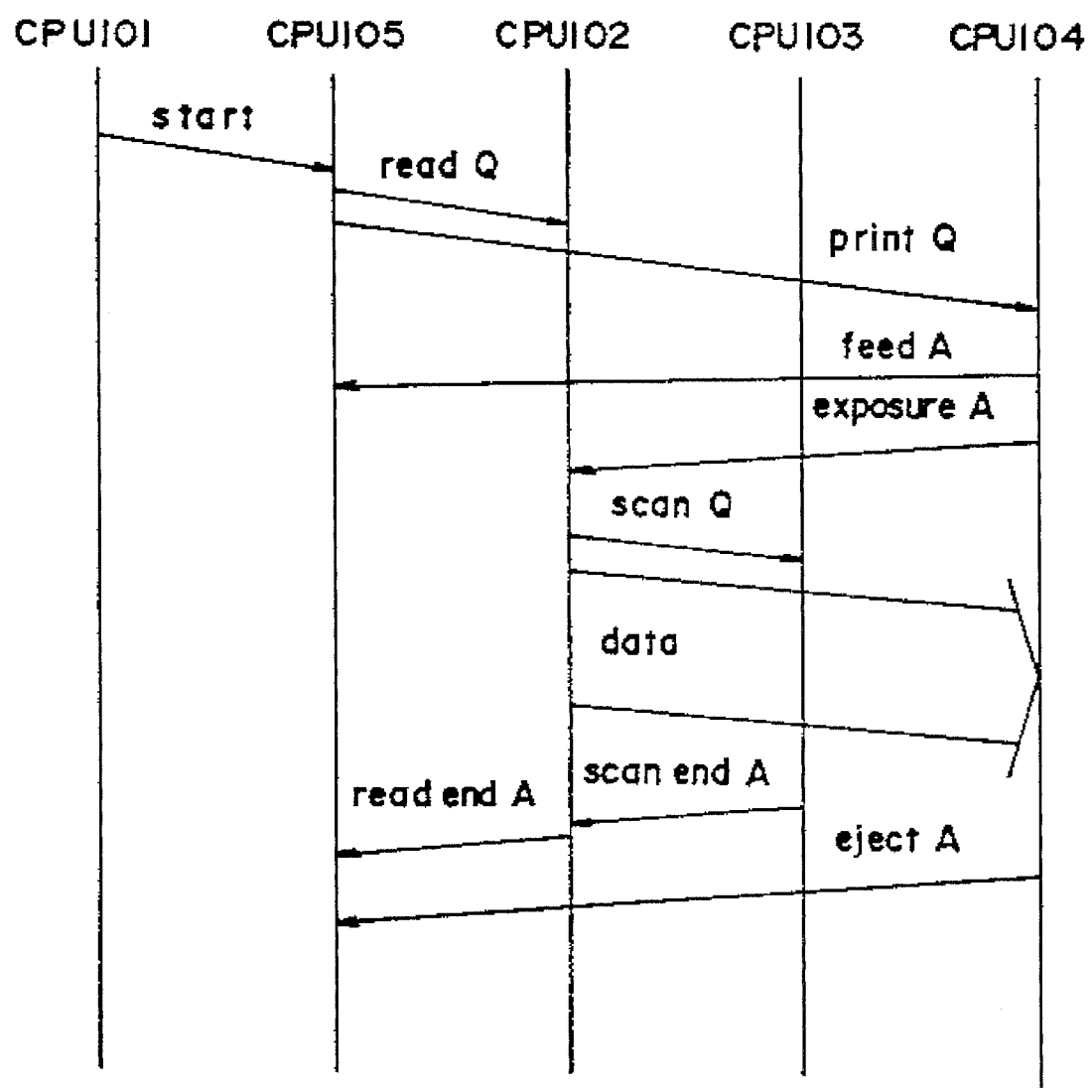
FIG. 8 is an illustration showing the operation sequence in the direct mode.

FIG. 8 shows the operating sequence of the direct mode.

As previously described, in the direct mode, image data read via the image reader IR are simultaneously printed by the printer PRT.

When the start key 96 is depressed, a start request is output from the CPU 101 to the CPU 105. The aforesaid start request is received by the CPU 105, and a read request is output to the CPU 102 and a print request is output to the CPU 104 from the CPU 105. A paper feed report is output from the CPU 104 to the CPU 105 to acknowledge the copy paper transport state.

The actual read timing of the scanner 19 is such that after the copy paper reaches a predetermined position in the image forming section 70, and an exposure preparation end report indicating a print enabled state has been output from the CPU 104 to the CPU 102 so as to have the operation of the image reader IR coincide with the operation of the printer PRT.

When the exposure preparation end report is output, a scan request is output from the CPU 102 to the CPU 103, which starts the scanning operation. When the scan reaches the image region of the original, the read data (image data) are output to the printer PRT and printed on the copy paper in accordance with the image processing mode (e.g., magnification process, γ correction, image quality correction processes and the like) set via the CPU 102.

When the scanner reading ends, a scan end report is output from the CPU 103 to the CPU 102, a read end report is output from the CPU 102 to the CPU 105, and a eject end report is output from the CPU 104 to the CPU 105.

Figure 9:
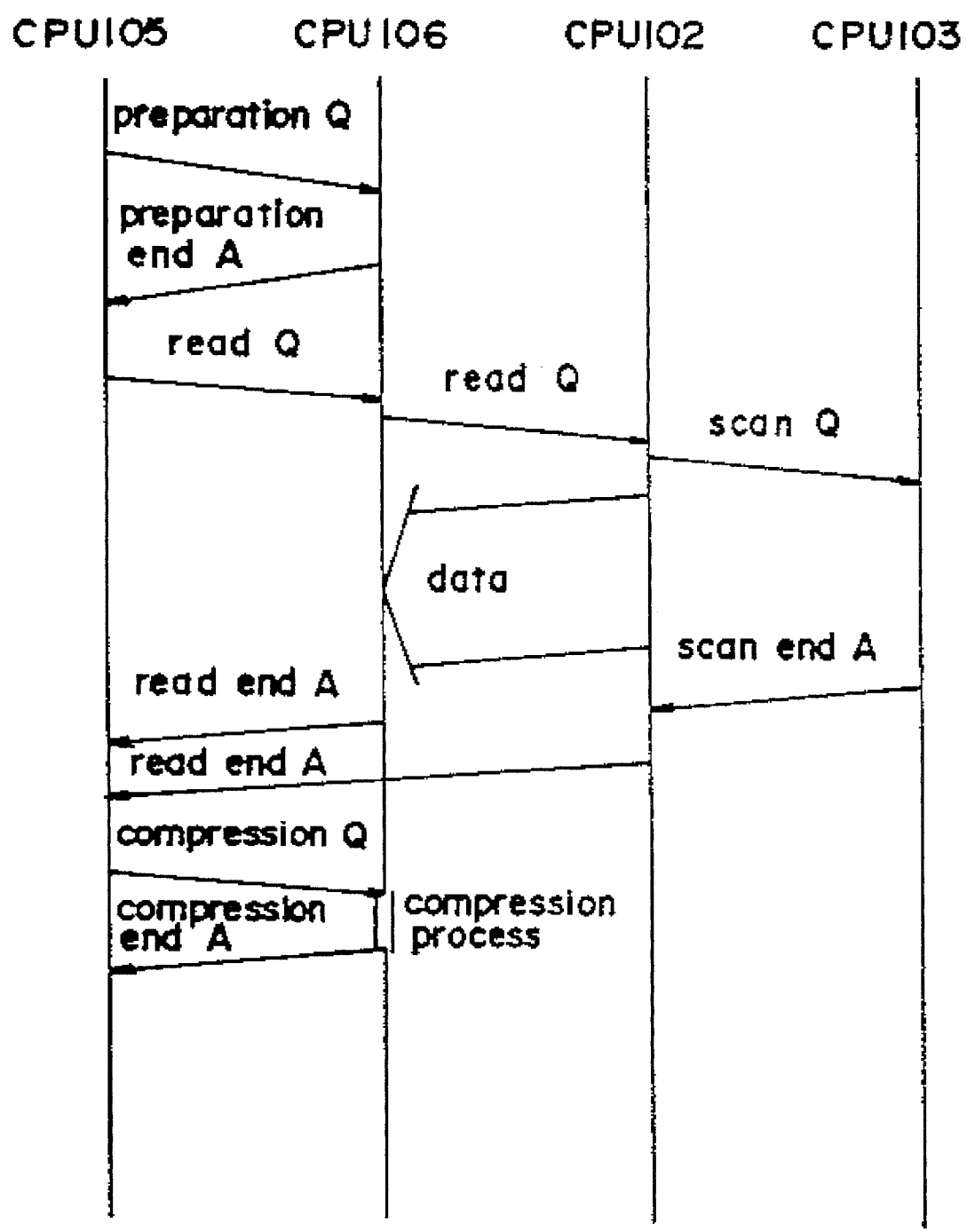
FIG. 9 is an illustration showing the operation sequence for the writing operation in the memory mode.

FIG. 9 shows the operation sequence of the memory mode (write).

As previously described, in the memory mode (write), image data are transmitted from the image reader IR to the image memory 304.

First, a memory preparation request is output from the CPU 105 which manages the general sequence to the CPU 106. When the aforesaid request is received, the CPU 106 executes various settings for internal hardware, sets the connective state for the selector section 301 to transmit the image data D2 from the image signal process section 20 to the image memory 304, sets the mode for the binary process (e.g., error dispersion method, threshold value for background erasure, binarization threshold value and the like), and sets the starting address for the write area and the XY lengths information of the image memory 304.

When the aforesaid settings are finished and the preparations are completed, a memory preparation end report is output from the CPU 106 to the CPU 105. When the aforesaid report is received, a read request is output from the CPU 102 to the CPU 103 to start the scanning operation.

When the scan reaches the image region of the original, the read data (image data D2) are output to the memory unit section 30 in accordance with the image processing mode set by the CPU 102.

When the scan is completed, read end reports are output from the CPUs 106 and 102, respectively, to the CPU 105.

Thereafter, the a compression request is output from the CPU 105 to the CPU 106. When the aforesaid request is received, the CPU 106 sets and starts the readout address and XY lengths information from the image memory 304, write address for the code memory 306, mode for the compressor 311 (e.g., MH method). Thus, the compression process is executed, and the encoded data are stored in the code memory 306.

When the compression process ends, a compression end report is output from the CPU 104 to the CPU 105.

Figure 10:
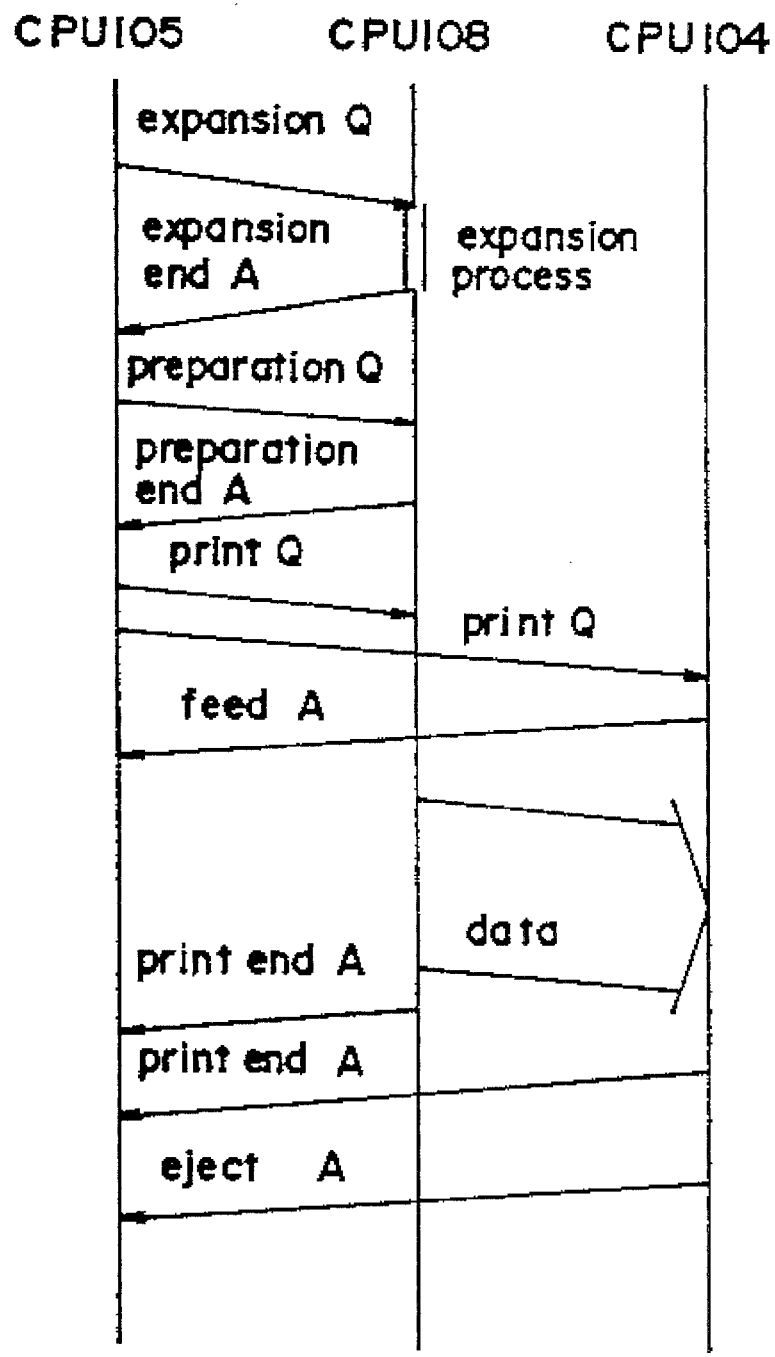
FIG. 10 is an illustration showing the operation sequence for the reading operation in the memory mode.

FIG. 10 shows the operation sequence for the memory mode (read).

As previously described, in the memory mode (read), image data are read out from the image memory 304 and output to the printer PRT to be printed on the copy paper.

First, an expansion request is output from the CPU 105 to the CPU 106. When the aforesaid request is received, the CPU 106 sets and starts the readout address from the code memory 306, data quantity, write address to the image memory 304, XY lengths information, and mode for the expander 312 (e.g., MH method). Thus, the expansion process is executed and the image data are written to the image memory 304.

When the expansion process ends, an expansion end report is output from the CPU 106 to the CPU 105. Then, a memory preparation request is output from the CPU 105 to the CPU 106 to read out the image data from the image memory 304. When the aforesaid request is received, the CPU 106 executes various settings for internal hardware, sets the connective state for the selector section 301 to output the image data D3 from the image memory 304 to the print process section 40, sets the rotation process, and sets the starting address for the readout area and the XY lengths information of the image memory 304.

When the aforesaid settings are completed and the preparation ends, a memory preparation end report is output from the CPU 106 to the CPU 105. When the aforesaid report is received, print requests are output from the CPU 105 to the CPUs 106 and 104, and a paper feed report is output form the CPU 104 to the CPU 105 to acknowledge the copy paper transport state. Thereafter, the image data D3 readout from the image memory 304 are output to the printer PRT and printed on copy paper.

When the printing ends, a print end report and eject report are output from the CPUs 106 and 104 to the CPU 105. When said reports are received, the CPU 105 outputs a memory clear request to the CPU 106 in connection with the operation mode.

Figure 11:
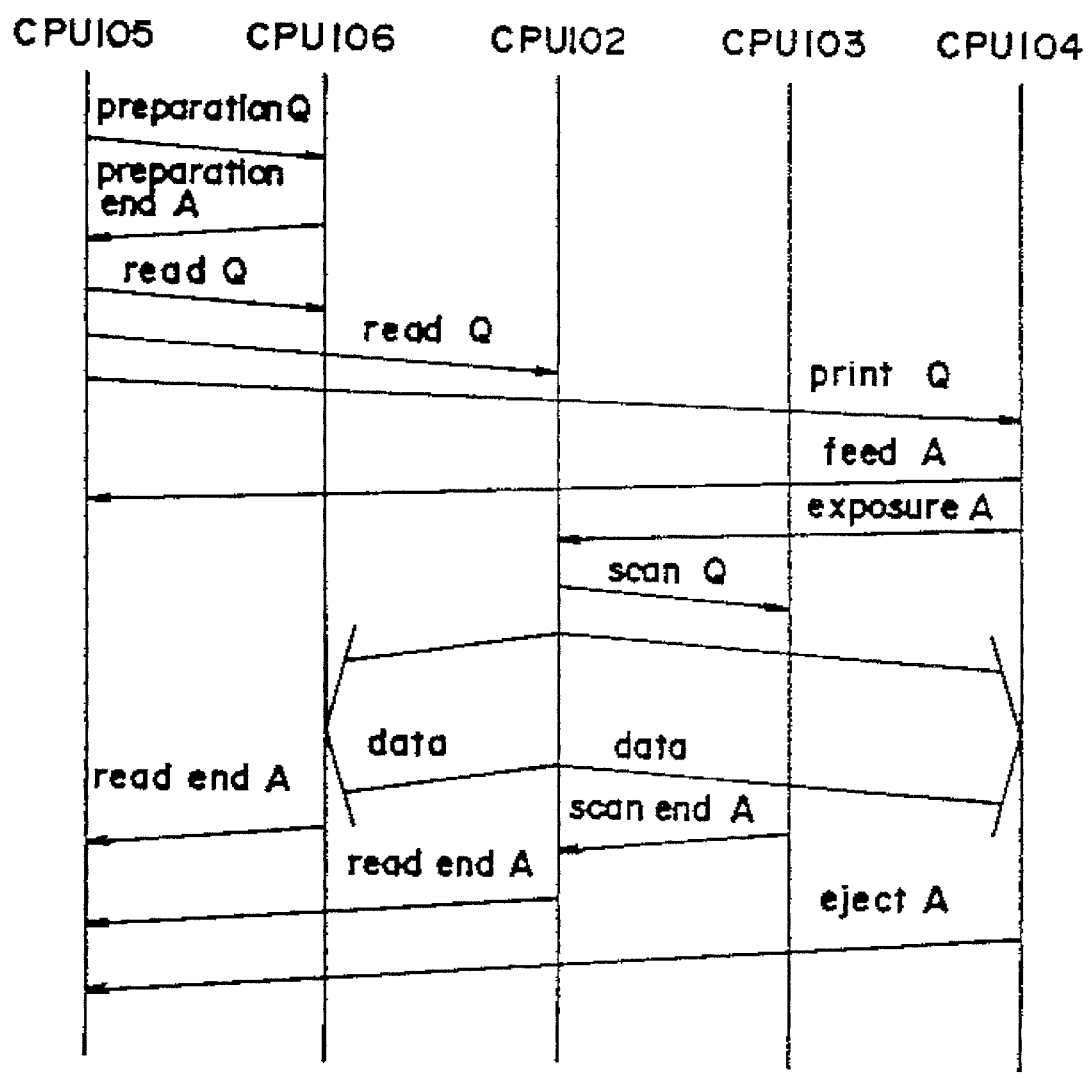
FIG. 11 is an illustration showing the operation sequence in the direct-and-memory mode.

FIG. 11 shows the operation sequence of the direct/ memory mode.

In the direct/memory mode, the image data D2 are output from the image reader IR to the printer PRT and printed, and at the same time said image data D2 are stored in the image memory 304.

A memory preparation request is output from the CPU 105 to the CPU 106. When the aforesaid request is received, the CPU 106 executes various settings for the internal hardware. When these settings are completed and the memory preparation ends, a memory preparation end report is output from the CPU 106 to the CPU 105. When the aforesaid report is received, read requests are output from the CPU 105 to the CPUs 106 and 102, and a print request is output to the CPU 104, respectively.

A paper feed report and an exposure preparation end report are output from the CPU 104 to the CPUs 105 and 102, then a scan request is output form the CPU 102 to the CPU 103. Thus, scanning is started, and the read data (image data) are output to the printer PRT and printed on a copy sheet, while at the same time the said image data are binarized and stored in the image memory 304.

When the scanning is completed, read end reports are respectively output from the CPUs 106 and 102 to the CPU 105, and a scan end report is output from the CPU 103 to the CPU 102.

Figure 12:
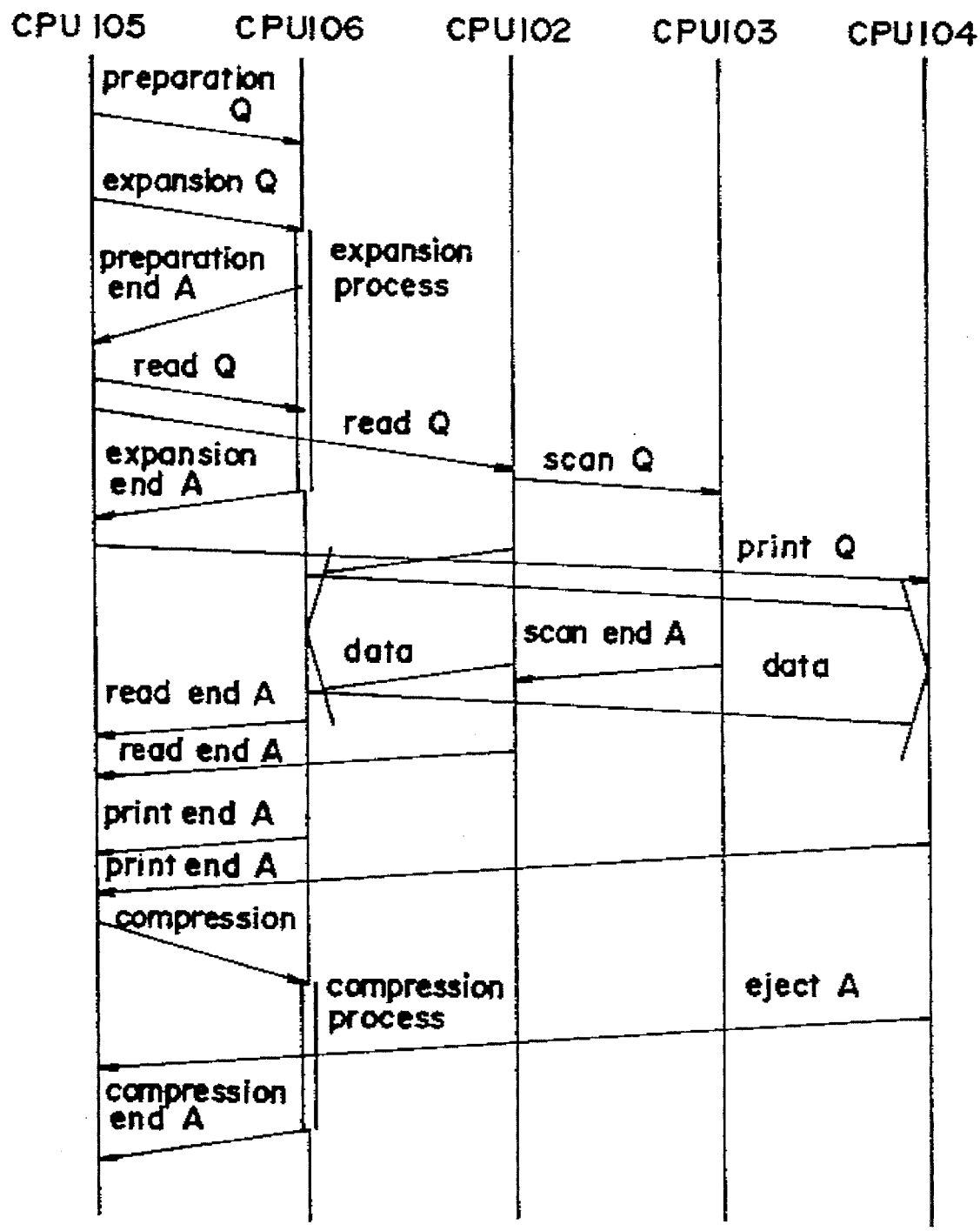
FIG. 12 is an illustration showing the operation sequence when the memory mode writing operation and the memory mode reading operation are executed in parallel.
Figure 13A:
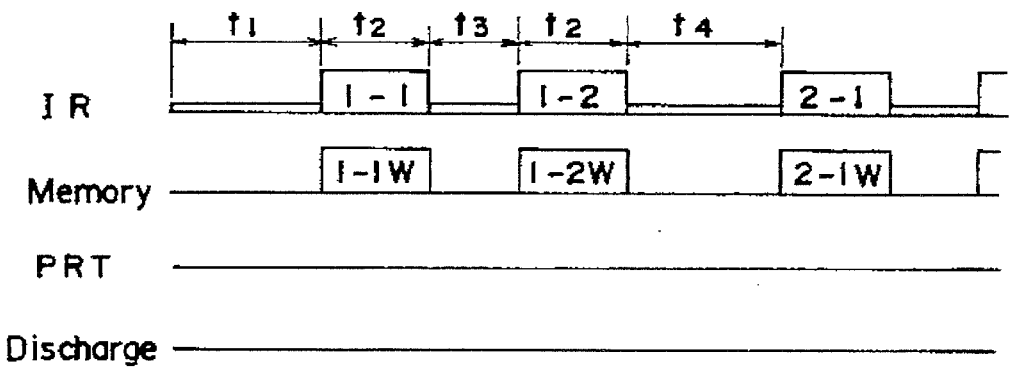
FIGS. 13a through 13f are a timing chart showing an example of the copy operation performed by the copying apparatus.
Figure 13B:
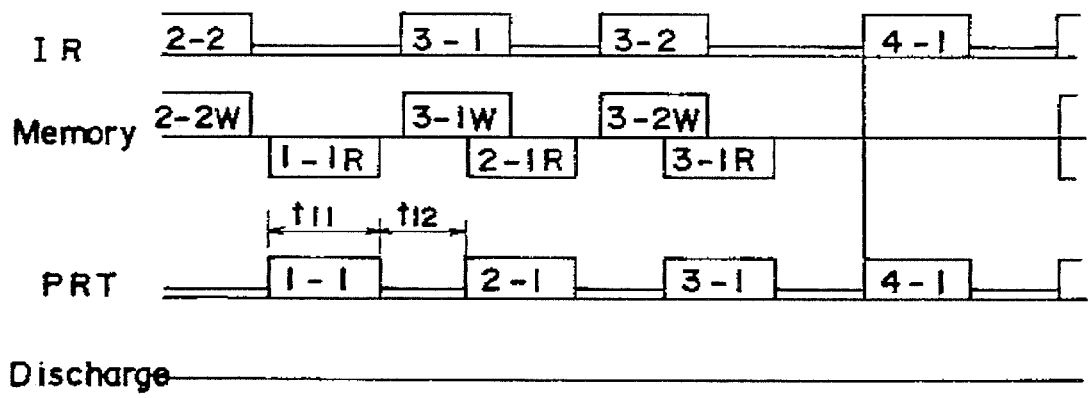
Figure 13C:
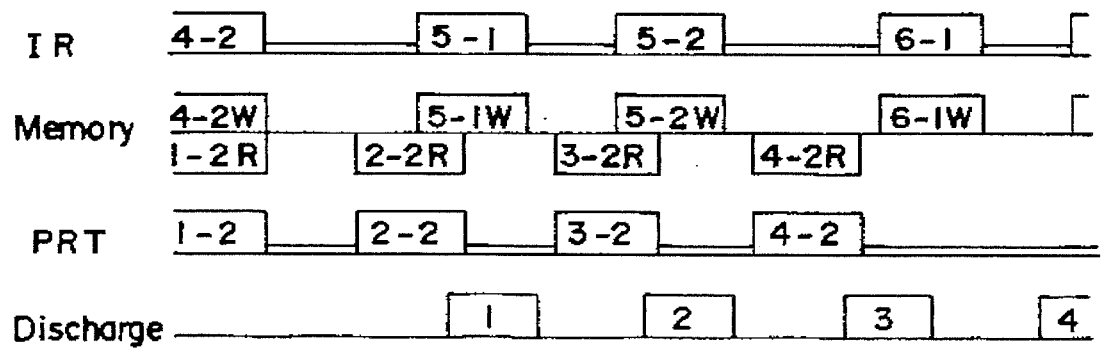
Figure 13D:
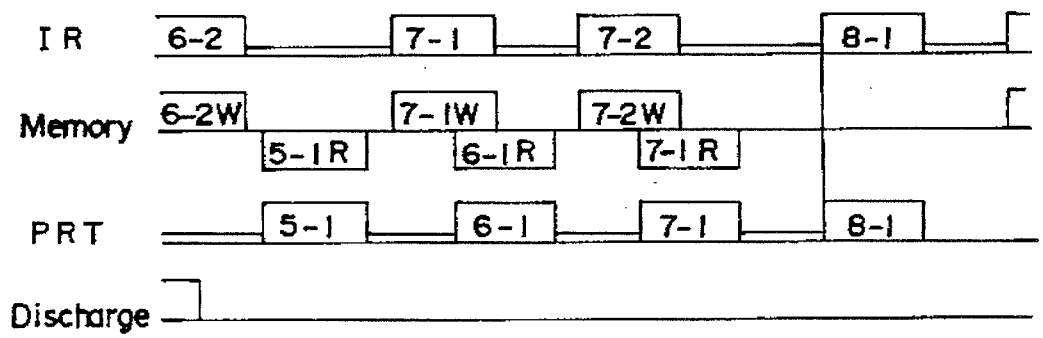
Figure 13E:
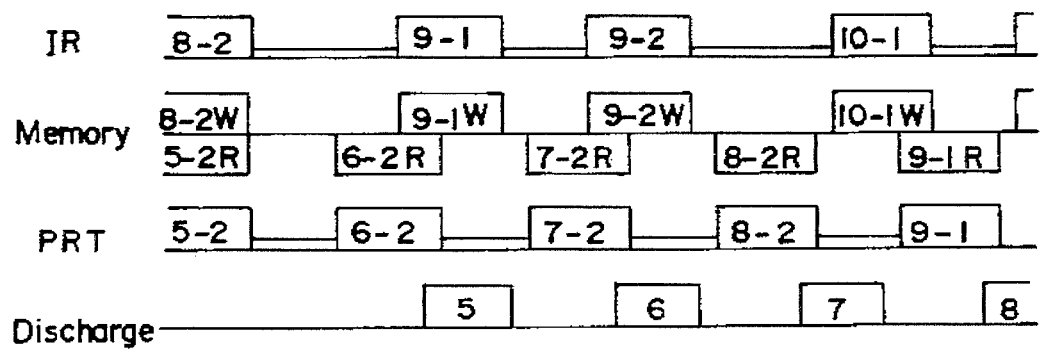
Figure 13F:
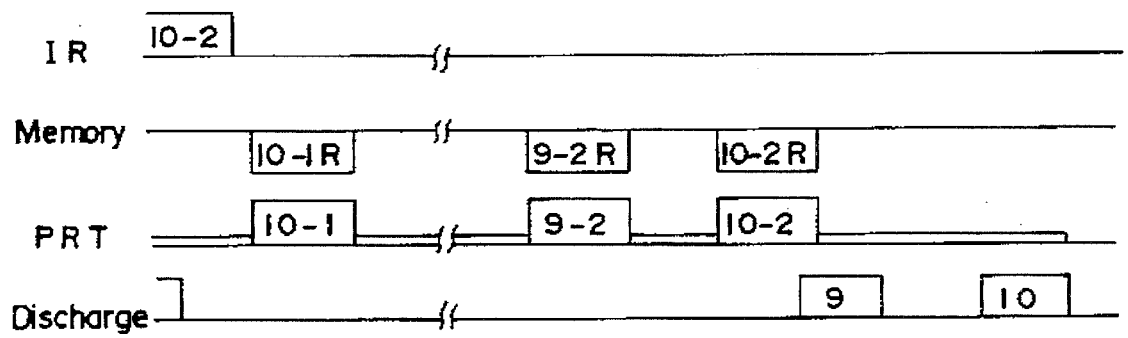

FIG. 12 shows the operating sequence when the memory mode (write) and memory mode (read) are executed in parallel.

Figure 15:
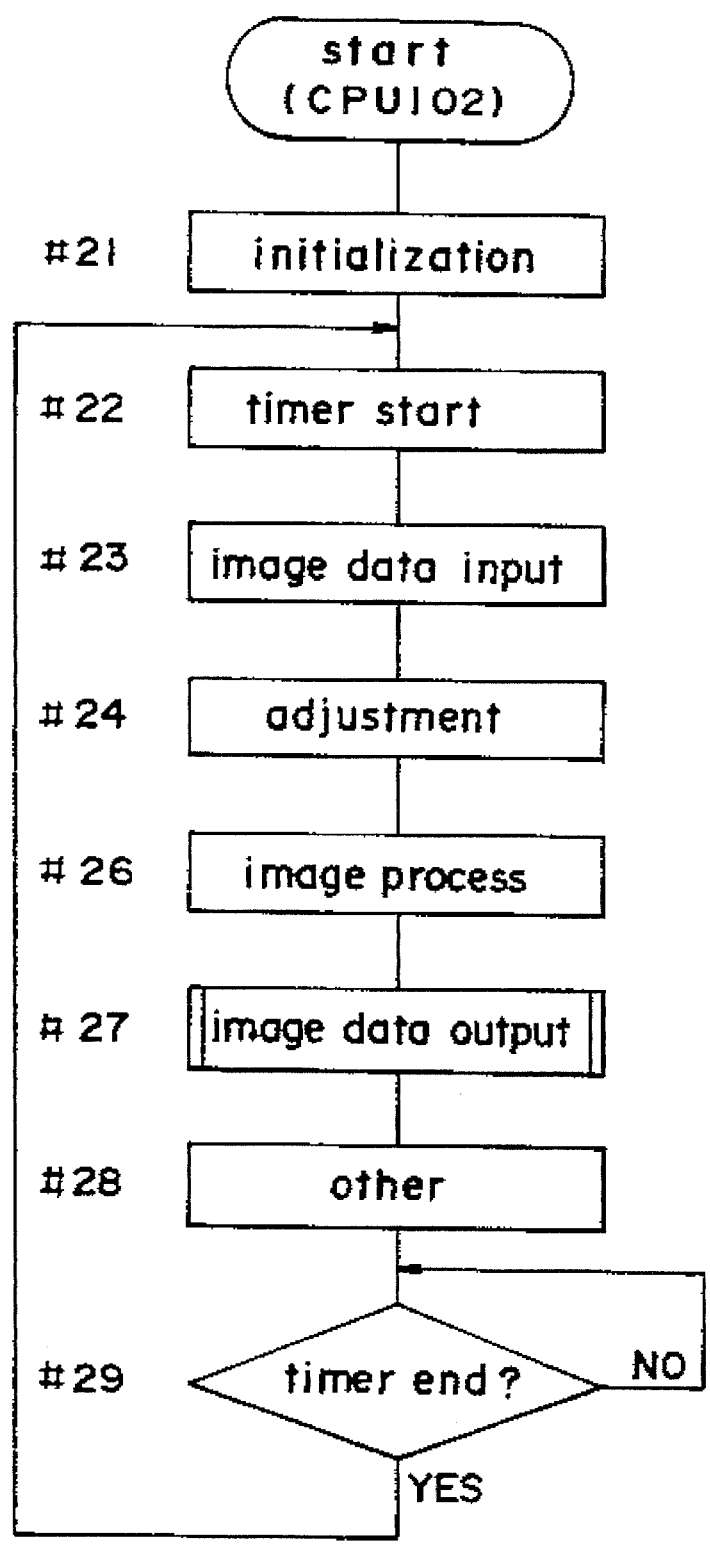
FIG. 15 is a flow chart showing the main routine of the CPU 102.

This operating sequence simultaneously executes the previously described memory mode (write) and memory mode (read) in parallel execution. This operating sequence is executed in the cases of [4–2W], [1–2R], as shown in FIG. 15, and which are discussed later. The contents of this operating sequence are identical to the operating sequences described previously with reference to FIGS. 9 and 10, and, therefore, further discussion is omitted from the present description.

FIGS. 13a through 13f are timing charts showing examples of the copy operation of the copying apparatus 1.

In the drawings, the numerals within the boxes indicate the number of the original and differentiate the front and back sides (front is 1, back is 2). The code [W] indicates writing to the image memory 304, and the code [R] indicates reading from the image memory 304. The numeral for discharge indicates the number of the copy sheet (the number of the copy sheet agrees with the number of the original).

In the drawings, the double line segments relative to the image reader IR indicate the transport operation for the originals via the document feeder 500, and the double line segments relative to the printer PRT indicate the transport operation for the copy paper within the printer PRT. The single line segments indicate the standby state. The data compression process, expansion process and transmission to and from the hard disk 310 are not shown in the drawings, but are executed after a writing operation or before a reading operation.

When the copy operation starts, a first original is fed (required time t1), the front side of said first original is read and stored in the image memory 304 via the memory mode (write) (required time t2), said original is transported (required time t3) and the back side is read and stored in image memory 304 (required time t2).

The first original is discharged and a second original is fed (required time t4), the front side of said second original is read and stored in the image memory 304 in the same manner as described for the first original.

While a third original is fed, the image data of the front side of the first original is read out from the image memory 304 using the memory mode (read), and said image data of the front side of the first original is printed on the front side of a first copy sheet (required time t11).

Then, a second copy sheet is transported (required time t12), the image data for the front side of the second original is read out from the image memory 304 and printed on the front side of the second copy sheet in the same manner. At this time, the image data for front side of the third original is read out via the memory mode (read), and a portion of said operation is executed in parallel. The reading of the fourth original back side (memory mode (write)) and the printing of the first original back side (memory mode (read)), and the reading of the eighth original back side and the printing of the fifth original back side are all executed in parallel operations.

Although all operations are executed in the memory modes in the aforesaid timing chart, the reading of the fourth and eighth originals, i.e., the reading of every fourth original, may be accomplished by switching the operation mode to the direct mode, such that the operations of reading of the original and the printing to the copy sheet are accomplished simultaneously. The time required before the printing the front side of the first and fifth originals is needed to conform with the timing for the execution of the aforesaid direct mode.

The aforesaid modes of writing to and reading from the image memory 304 are executed sequentially by the tasks generated relative to the respective pages. In the direct mode, the image reader IR and the printer PRT are operated with synchronous timing such that said tasks are not generated.

Examples of actual values for the previously described required times are, in the case of A4 size originals, t1=2.05 sec, t2=1.27 sec, t3=1.25 sec, t4=2.15 sec, t11=1.27 sec, t12=1.26 sec. The total time required for ten duplex originals would then be about 75 seconds.

As a comparative example, conventional duplex copies are made of the front and back sides of a first original and the front and back sides of a second original by feeding and inverting the originals in order starting with the first original, refeeding the copy sheets, and reading the originals and printing simultaneously. In this case, considerable time is required to invert the originals and refeed the copy sheets so that making ten duplex copies required nearly twice as much time, i.e., about 135 seconds.

Take, for example, the case of an image reader IR capable of processing 30 pages per minute and a printer PRT capable of processing 35 pages per minute. Making duplex copies of duplex originals with a conventional copying apparatus reduces the processing capacity by several pages per minute, whereas the copying apparatus of the present embodiment achieves a performance several times better than a conventional arrangement.

Thus, in the copying apparatus 1 of the present embodiment, the image reader IR and the printer PRT are capable of operating independently, i.e., writing to (reading of the original) and reading from (printing) the memory unit section 30 are executed in independent circuit blocks, such that reading of originals and printing to the copy sheets can be executed in parallel by dynamically managing the code memory 306 using the management table MT1. Furthermore, the aforesaid arrangement in conjunction with the switching of the operation modes during the same copy mode increases the copying speed and improves productivity.

The operation of the copying apparatus 1 is described hereinafter with reference to the accompanying flow charts. The order of the following description follows the sequence of the main routines executed by the CPUs 101–108, followed by descriptions of the subroutines executed in each of the various main routines.

Figure 14:
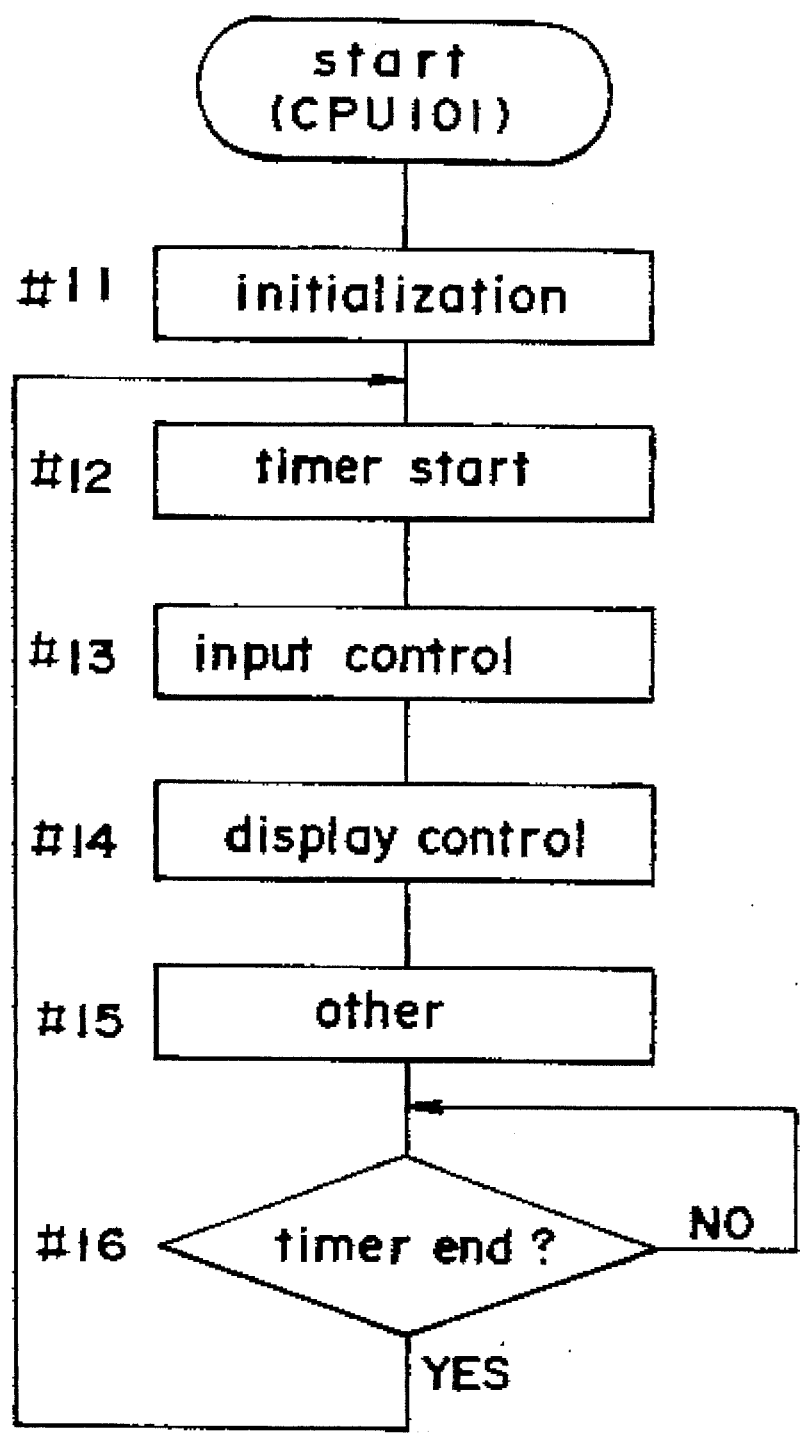
FIG. 14 is a flow chart showing the main routine of the CPU 101.

FIG. 14 is a flow chart showing the main routine of the CPU 101.

Following initialization (step #11), the internal timers are started and monitored to regularize the tie for the various routines (steps #12, #16), the input control process and the display control process for the operation panel OP are executed (steps #13, #14), and other processes are executed (step #15). Communication with the other CPUs 102–108 is accomplished via the interrupt process.

FIG. 15 is a flow chart showing the main routine of the CPU 102.

After the image data input process is executed (step #23), the positioning adjustment process is executed to compensate the time difference produced by the positional dislocation of the photoelectric converter elements 16 and 17 (step #24), the various types of image processes are executed in accordance with the magnification and the like (step #26), the image data output process is executed to output image data to the memory unit section 30 (step #27), then other processing is executed (step #28).

Figure 16:
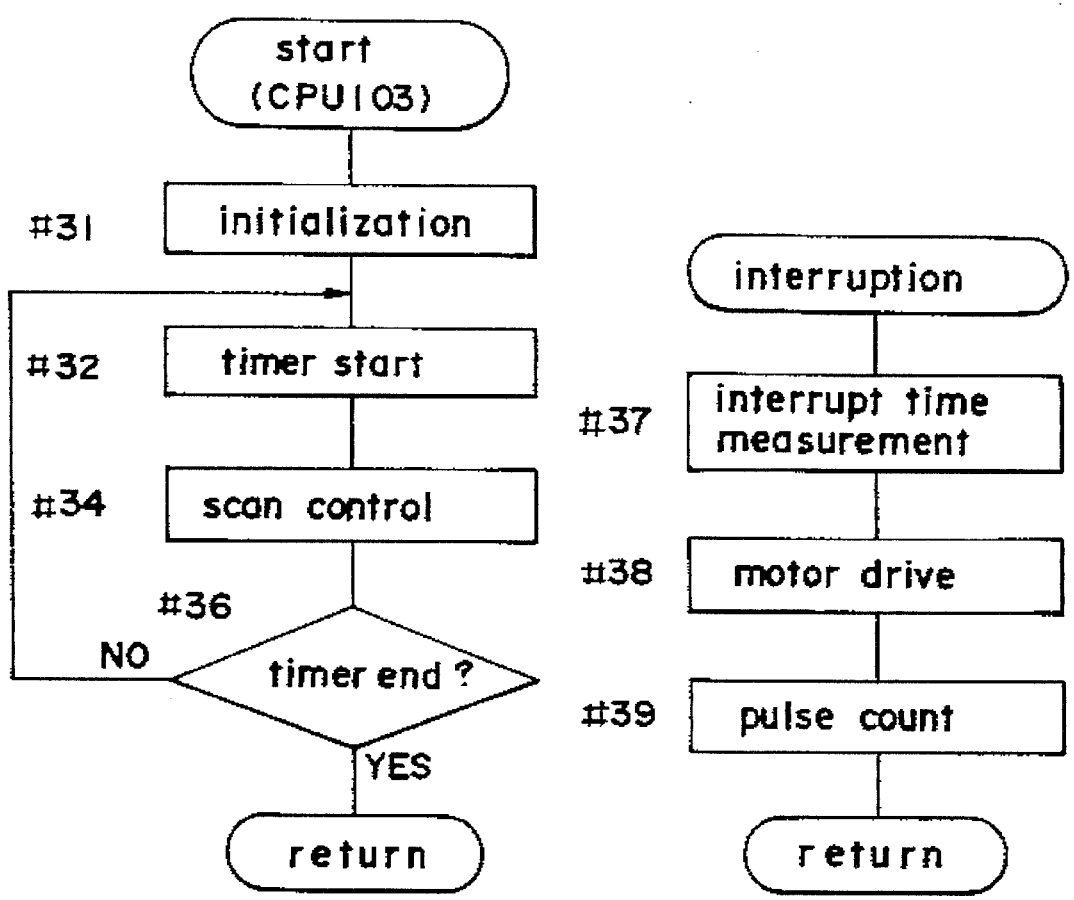
FIG. 16 is a flow chart showing the main routine of the CPU 103.

FIG. 16 is a flow chart showing the main routine of the CPU 103.

The CPU 103 controls the scanning unit 10. a target length Lt is calculated based on the original length Ld and the number of originals set on the platen glass 18, and scan controls are executed such that the scanner 19 moves at constant speed from the home position HP only the target distance Lt in a leftward direction (step #34).

When a motor pulse interrupt is generated by the motor pulse produced synchronously with the rotation of the scan motor M2, the time interval of said motor pulse interrupt is measured (step #37), the electric current supplied to the scan motor is switched ON or OFF (step #38), and the motor pulses are counted (step #39).

Figure 17:
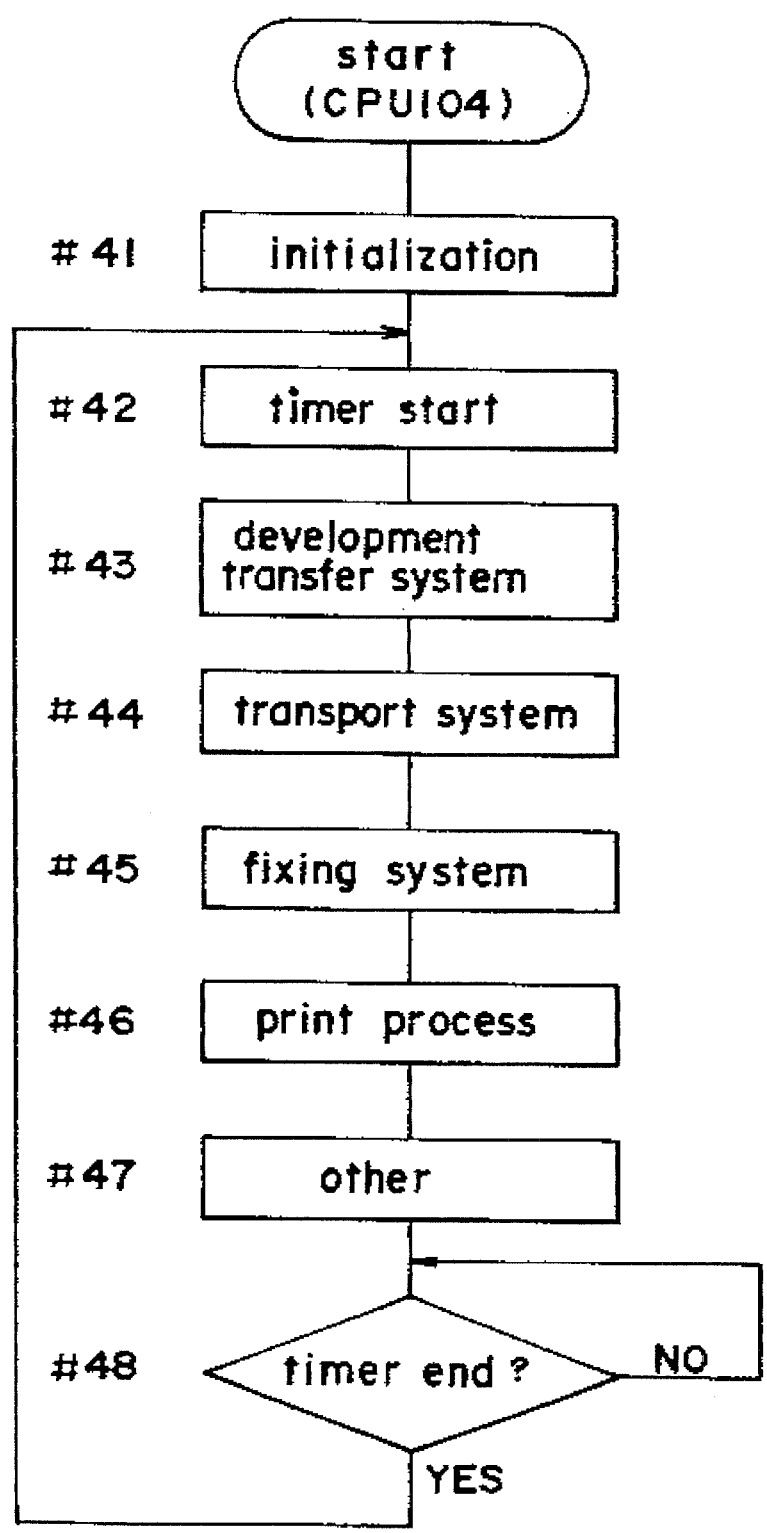
FIG. 17 is a flow chart showing the main routine of the CPU 104.

FIG. 17 is a flow chart showing the main routine of the CPU 104.

The CPU 104 controls the printer PRT. The developing-transfer system 70A is controlled (step #43), the transport system 70B is controlled (step #44), the fixing system 70C is controlled (step #45), the print process section 40 is controlled (step #46), and other processes are executed (step #47).

In the controls executed in the aforesaid step #44, after the size of the copy paper is detected by the size sensors SE11 and SE12, the copy paper refeed path length, distance between copy sheets, and copy paper size are calculated by the CPU 104, and the number of sheets M which can be stacked in the paper refeed path is determined. Since the paper refeed path length and the distance between sheets are in agreement, the number of sheets stackable in the refeed path can be determined from the detected copy paper size.

Figure 18:
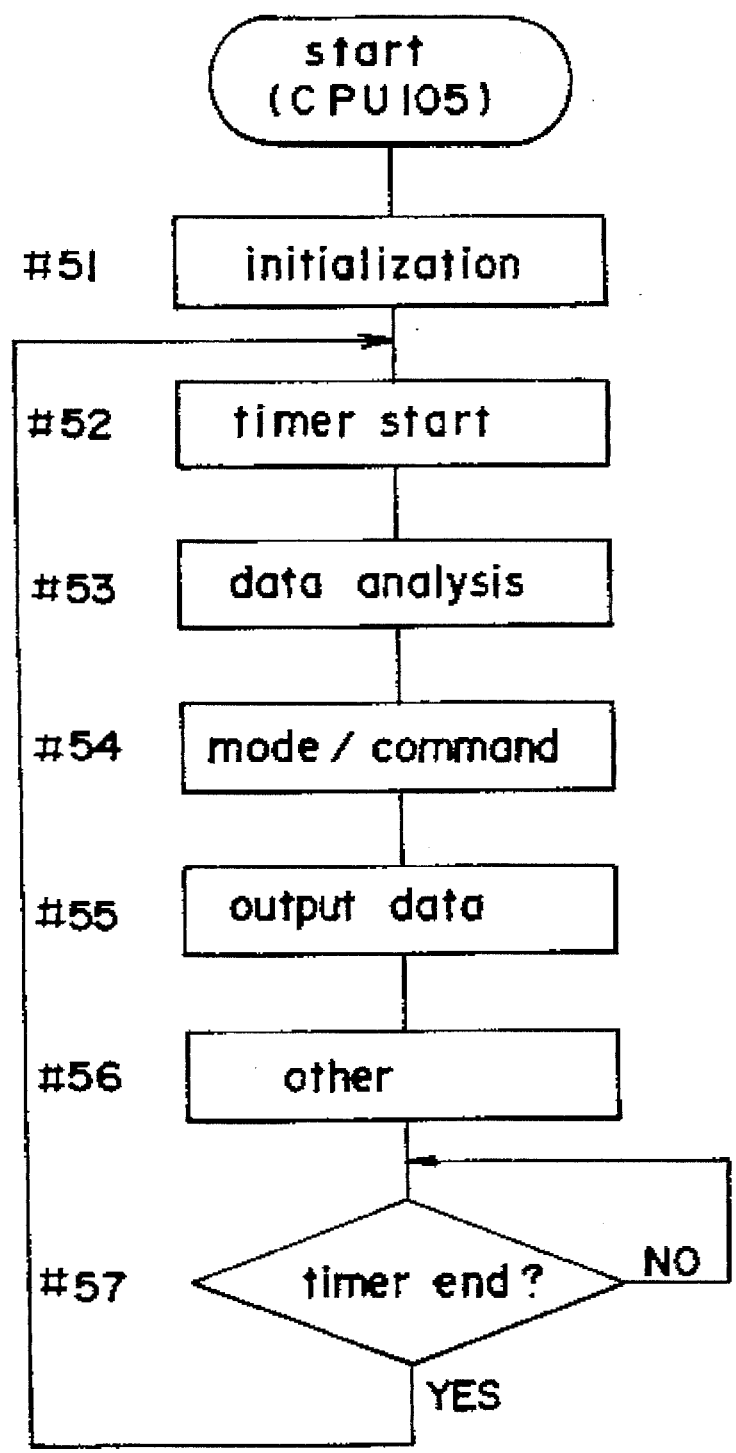
FIG. 18 is a flow chart showing the main routine of the CPU 105.

FIG. 18 is a flow chart showing the main routine of the CPU 105.

The CPU 105 controls the general operation of the copying apparatus 1, and sets the operation modes and issues start and stop commands for the other CPUs. After the data input via interrupt communication is checked, the contents of said data are analyzed (step #53), and when a next operation is specified, the magnification changes and the like, the mode/command process is executed to issue start commands or update the magnification mode data (step #54), then said data are set in the output area to be output via communication (step #55).

Figure 19:
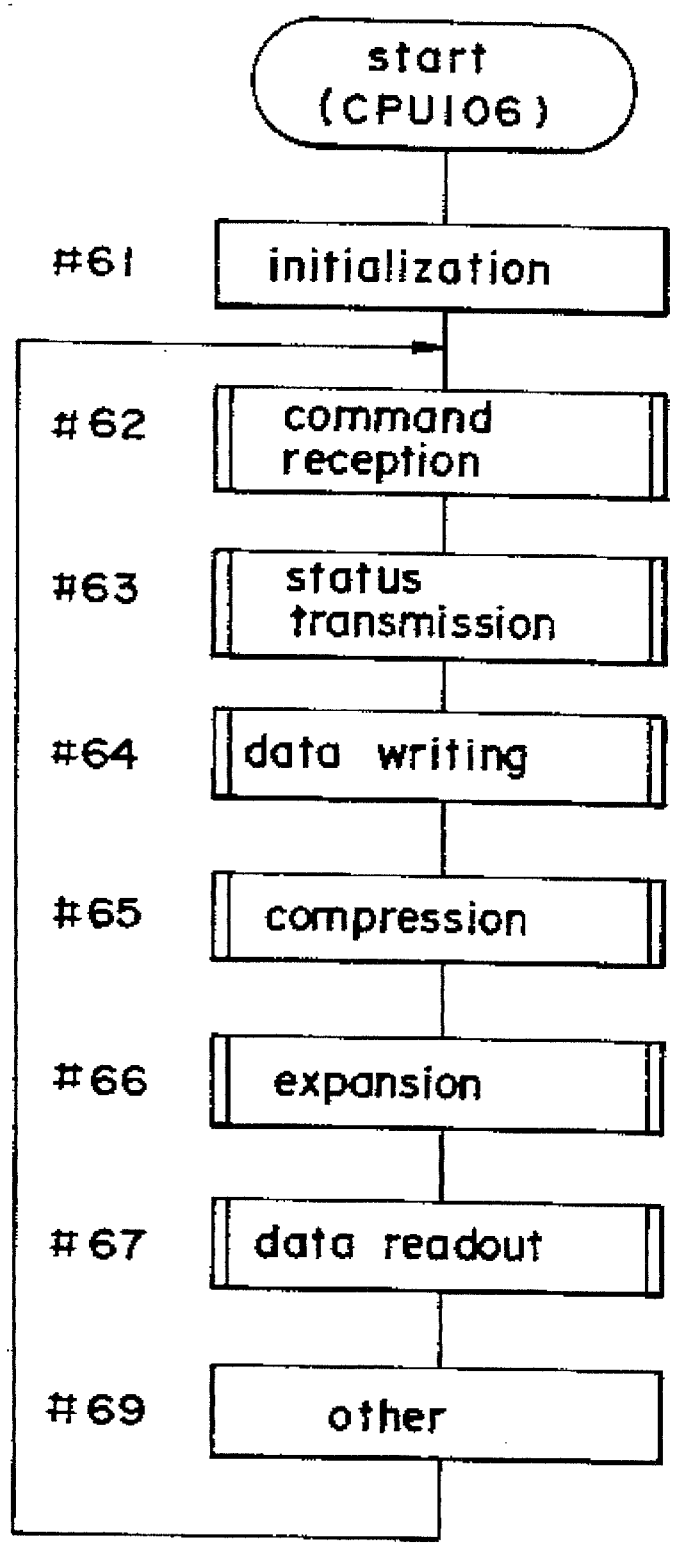
FIG. 19 is a flow chart showing the main routine of the CPU 106.

FIG. 19 is a flow chart showing the main routine of the CPU 106.

The CPU 106 controls the memory unit section 30. The CPU 106 executes the command reception process for commands from other CPUs (step #62), the status transmission process is executed (step #63), the data writing process is executed to write data to the image memory 304 (step #64), compression controls are executed (step #65), expansion controls are executed (step #66), and the data readout controls are executed to readout data from the image memory 304 (step #67).

Figure 20:
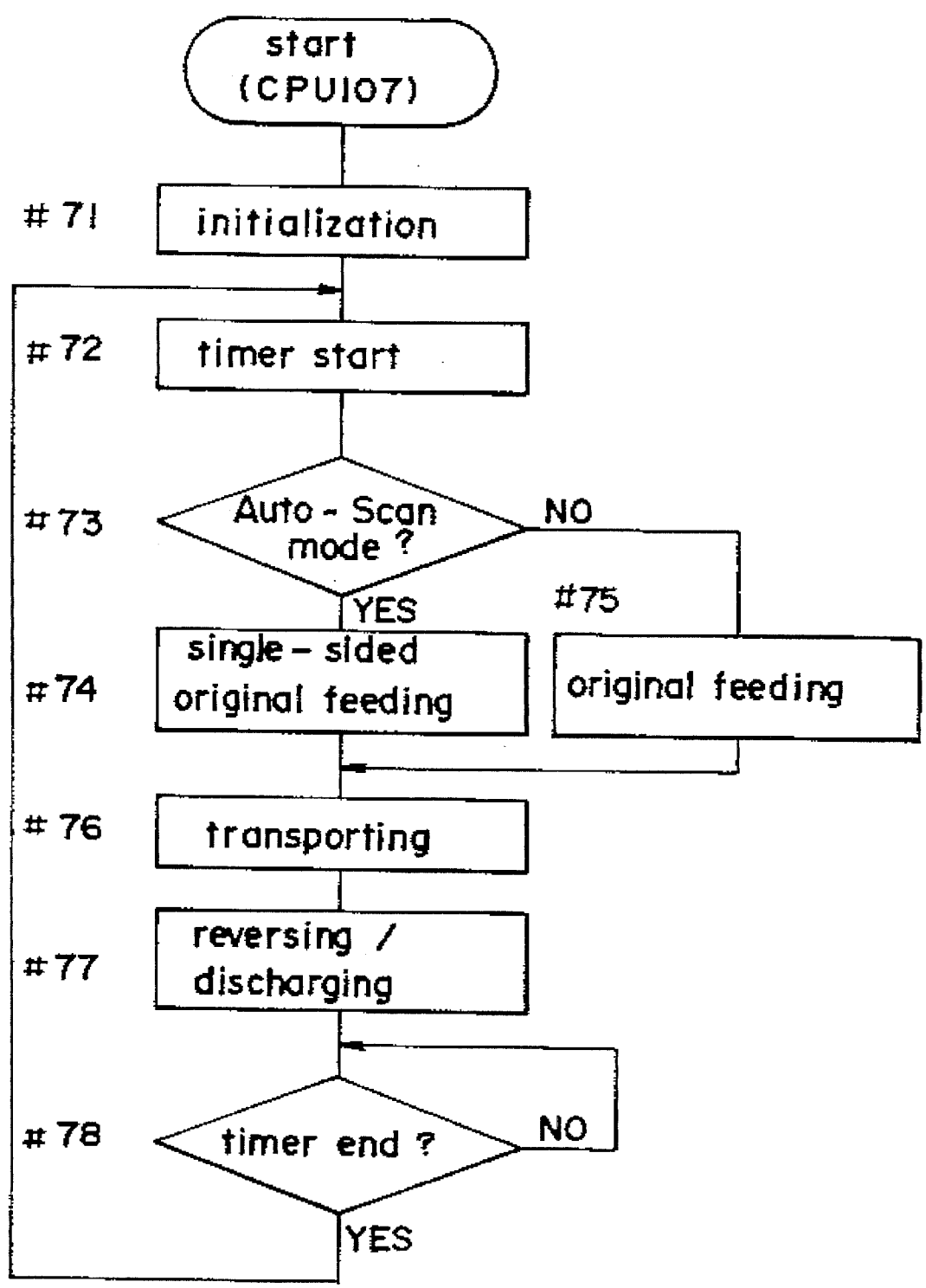
FIG. 20 is a flow chart showing the main routine of the CPU 107.

FIG. 20 is a flow chart showing the main routine of the CPU 107.

The CPU 107 controls the document feeder 500. In the autoscan mode (step #73: YES), the single-side original feed process is executed wherein the inclination of the originals is corrected and a number of originals equal to the number of settable sheets ECNT are fed consecutively via the transport belt 506 (step #74). When the autoscan mode is not specified, the normal original feeding process is executed wherein the inclination of each original is corrected and the original is fed to the transport belt 506 (step #75).

The original is positioned at a predetermined reading position on the platen glass 18 via the transport belt 506, and after said original is read, the original feed process is executed to feed the original to the inverting roller 507 via the transport belt 506 (step #76). Then, the original reversing/discharge process is executed to either directly discharge the original at the inverting roller 507 or refeed said original to the transport belt 506. (step #77).

Figure 21:
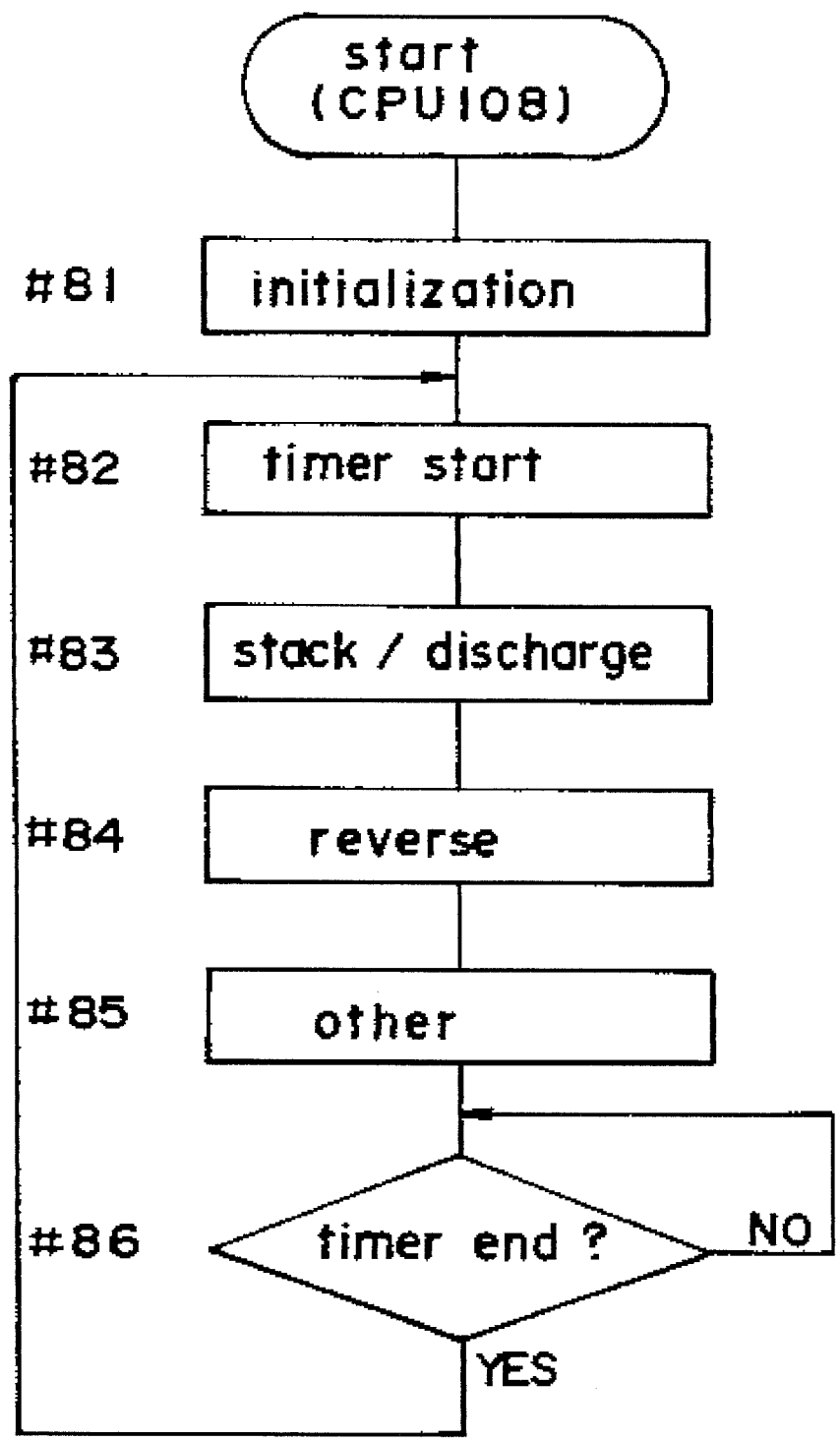
FIG. 21 is a flow chart showing the main routine of the CPU 108.

FIG. 21 is a flow chart showing the main routine of the CPU 108.

The CPU 108 controls the paper refeeding portion 600. The stack/discharge process is executed to either temporarily store the printed copy sheet discharged from the image forming system 70 so that said sheet can be printed on the back side thereof, or directly discharge said copy sheet to the discharge tray 621 (step #83). Then, the reversing process is executed to invert a stored copy sheet front-to-back (step #84).

In the stack/discharge process, copy sheets discharged from the image forming system 70 are detected by the discharge sensor SE62 provided at the discharge port of said image forming system 70. During discharge, the transport roller 602 is rotated until discharge is completed, and a predetermined time after said discharge completion the rotation of the transport roller 602 is stopped.

In the reversing process, the inverting roller 603 is forward rotated while the reversing sensor SE61 detects a copy sheet, and the inverting roller 603 is reversely rotated at the moment the reversing sensor SE61 is turned OFF, and said inverting roller 603 is stopped a set time thereafter.

Figure 22A:
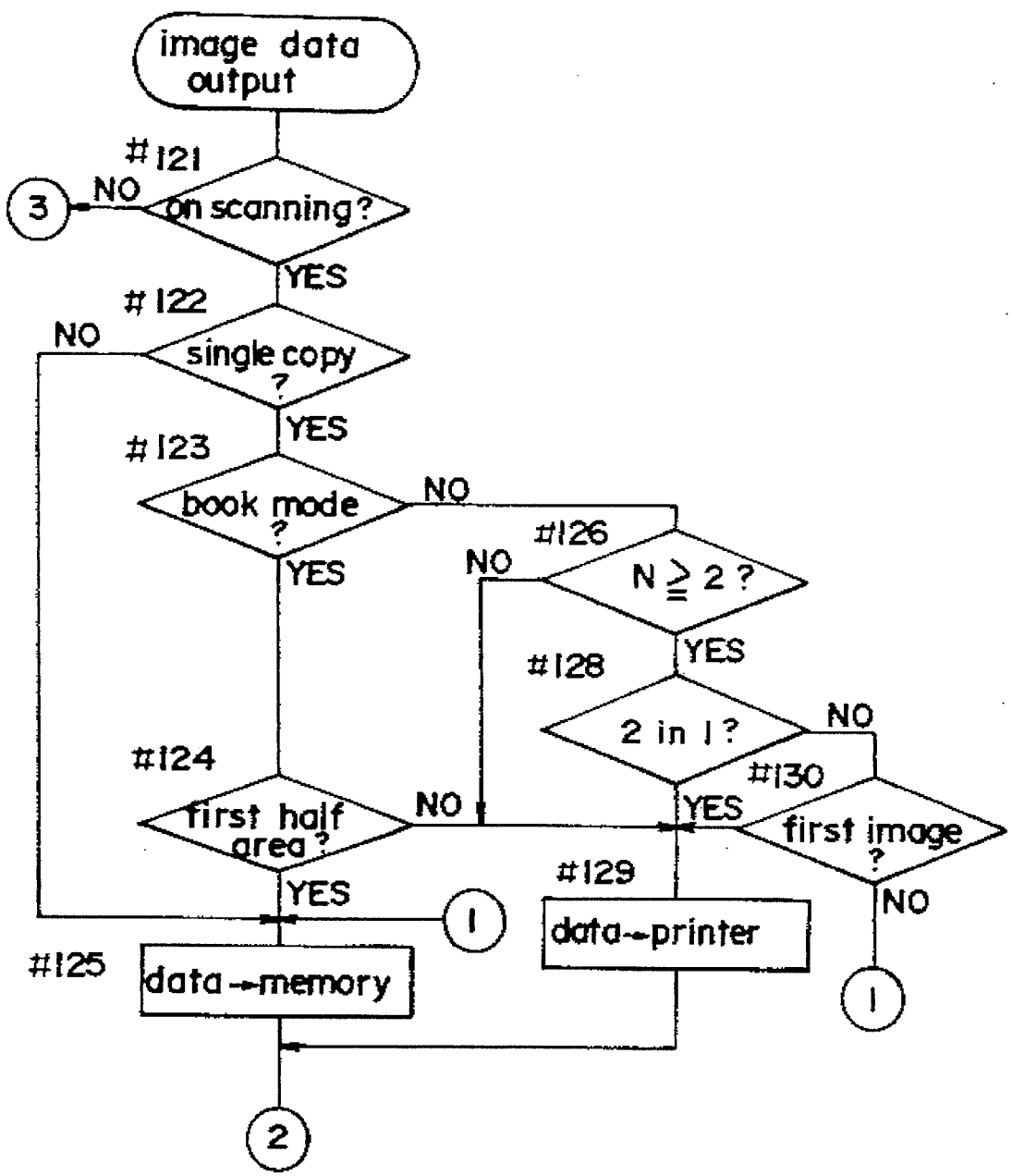
FIGS. 22a and 22b are a flow chart showing the image data output process.
Figure 22:
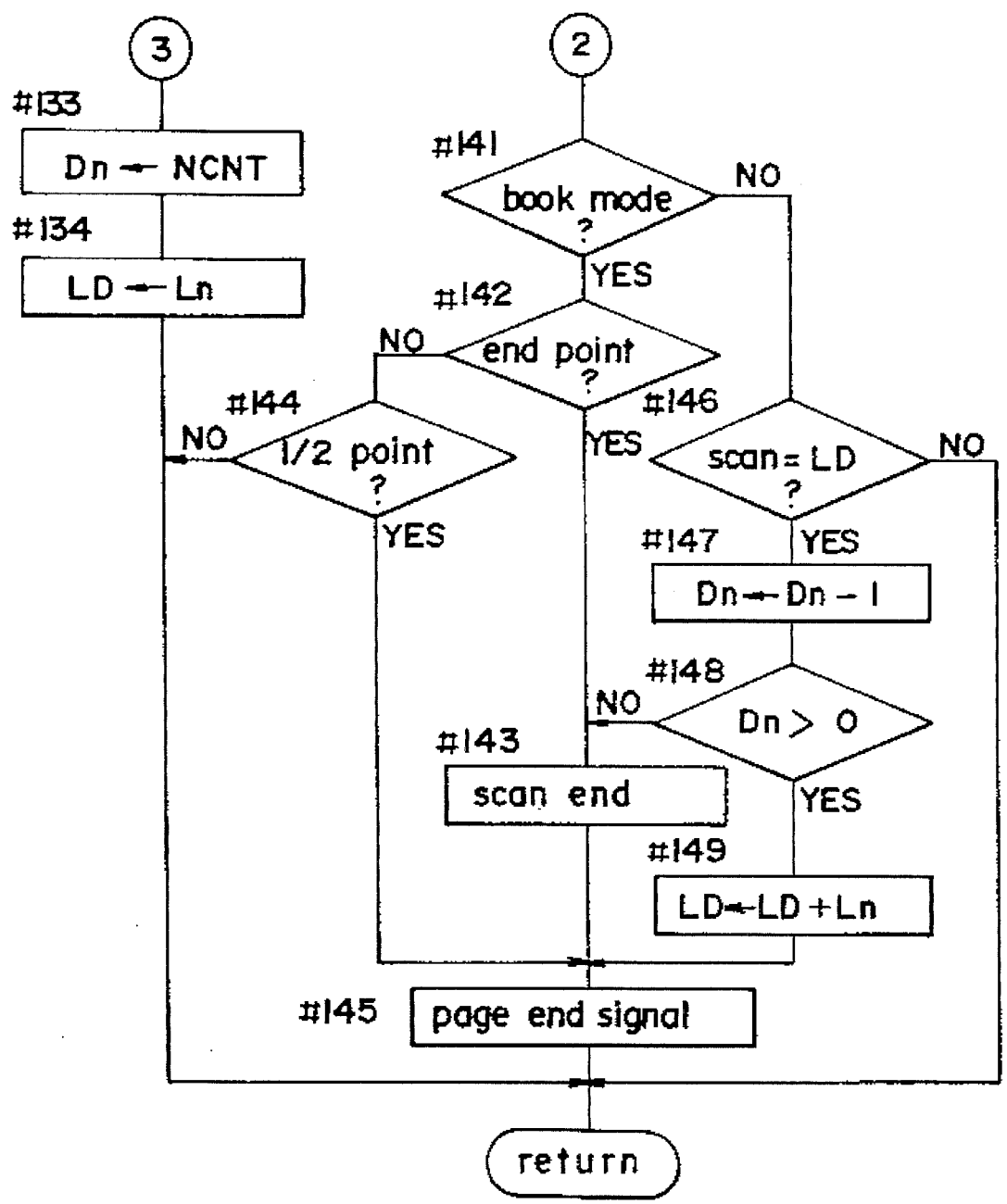

FIGS. 22a and 22b are a flow chart showing the image data output process of the previously mentioned step #27.

First, before the scanner 19 begins scanning (scan operation) (step #121: NO), the value of the counter NCNT expressing the number of originals set on the platen glass 18 is set in the counter Dn (step #133), and the original length Ln of the Dn$^{th}$ original is set in the counter LD expressing the cutoff position marking the boundary of the original (step #134). Accordingly, in this case, the original length Ln of the last original among a plurality of originals set on the platen glass 18 is set in the counter LD.

During a scanning operation performed by the scanner 19 (step #121: YES), when the single copy and book modes are specified (steps #122, #123: YES), the image data of the first half of the total original length are written to the image memory 304 (step #125), and the image data for the latter half are output to the printer PRT through the memory unit section 30 (step #129).

When the book copy mode is not specified (step #123: NO), and either a single original is placed on the platen glass 18 (step #126: NO) or the two-in-one mode is specified (step #128: YES), the image data are output to the printer PRT. If there are a plurality of originals and the two-in-one mode is not specified, the image data of the first original (step #130: YES) are output to the printer PRT, and the image data of the second and subsequent originals are written to the image memory 304.

During a scanning operation performed by the scanner 19 and when the book mode has been selected (step #141: YES), at the moments the scanner 19 reaches the ½ point and the endpoint in the original document length (steps #142, #144), page end signals are generated (step #145). At this time, when the scanner 19 reaches the endpoint of the original document length, the end of the scan is indicated (step #143).

When the book mode is not specified (step #141: NO) and the scanning length of the scanner 19 equals the value of the counter LD, i.e., when the scanner 19 has reached the boundary of each original (step #146: YES), a page end signal is generated (step #145). At this time, the value of the counter Dn is decremented by 1 (step #147), and the original length Ln of the Dn$^{th}$ original is added to the counter LD (step #149). The aforesaid process is repeated until the value of the counter Dn reaches [0]. When the value of the counter Dn reaches [0] (step #148: YES), the end of scan is indicated (step #143).

Thus, page end signals are generated for all the originals placed on the platen glass 18.

Figure 23:
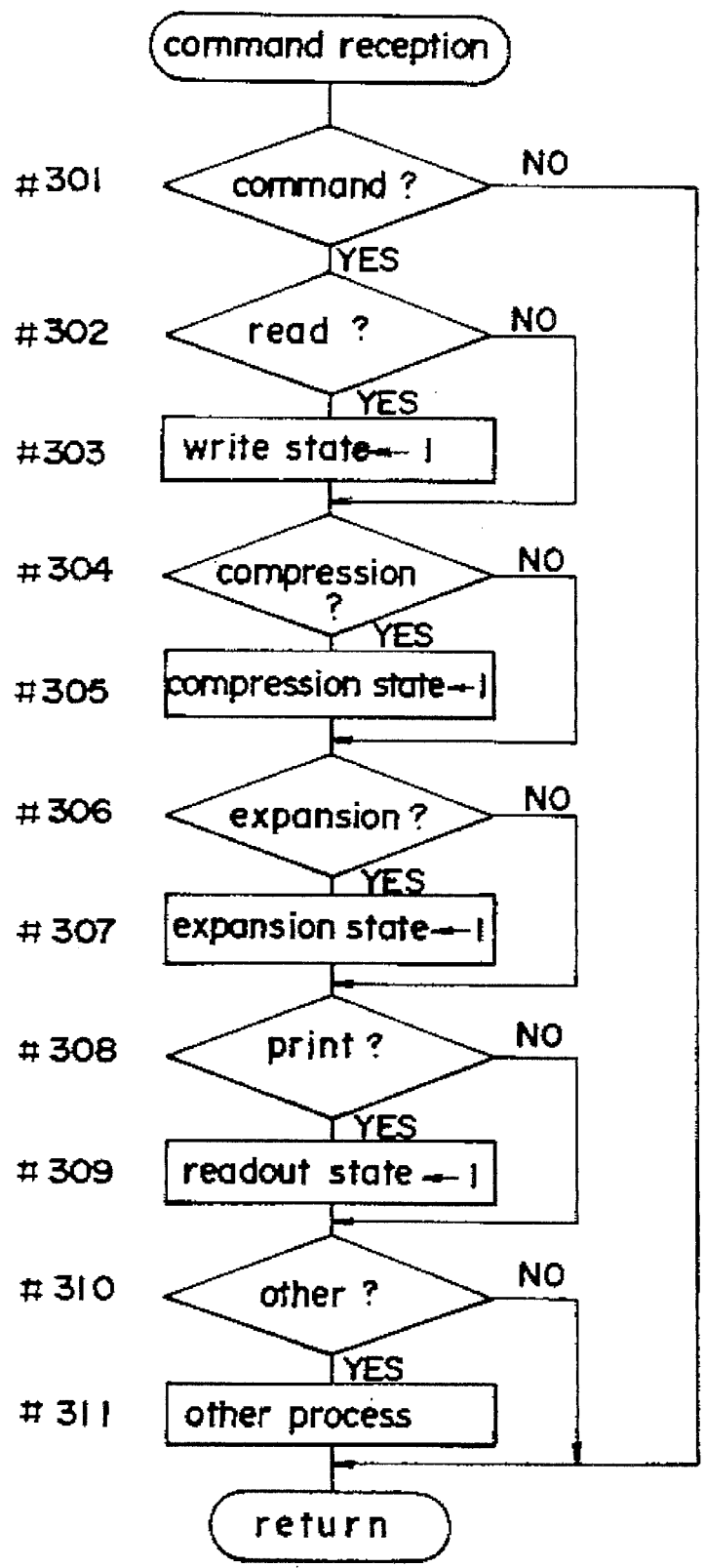
FIG. 23 is a flow chart showing the command reception process.

FIG. 23 is a flow chart showing the command reception process of step #62.

When a command is received (step #301: YES) and said command is a read command, the write state of the image memory 304 is set at [1] (steps #302, #303); when said command is a compression command, the compression state is set at [1] (steps #304, #305); when said command is an expansion command, the expansion state is set at [1] (steps #306, #307); when said command is a print command, the print state is set at [1] (steps #308, #309).

Figure 24:
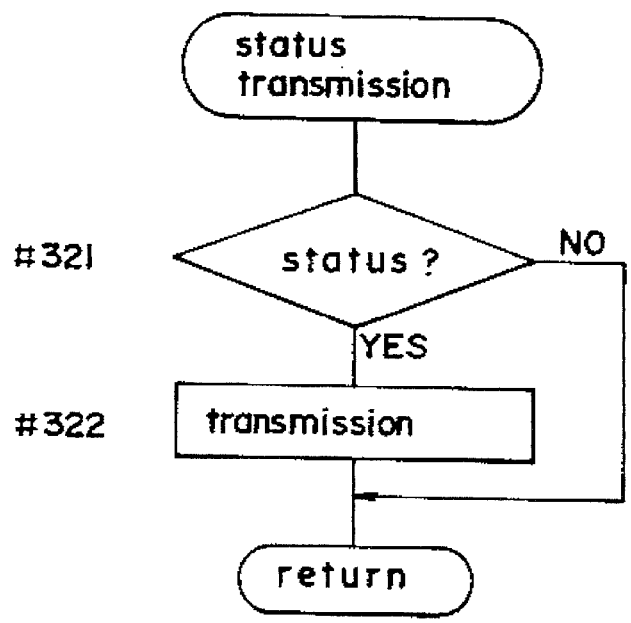
FIG. 24 Is a flow chart showing the status transmission process.

FIG. 24 is a flow chart showing the status transmission process of step #63.

When a status transmission is issued, said statement is transmitted (steps #321, #322).

Figure 25:
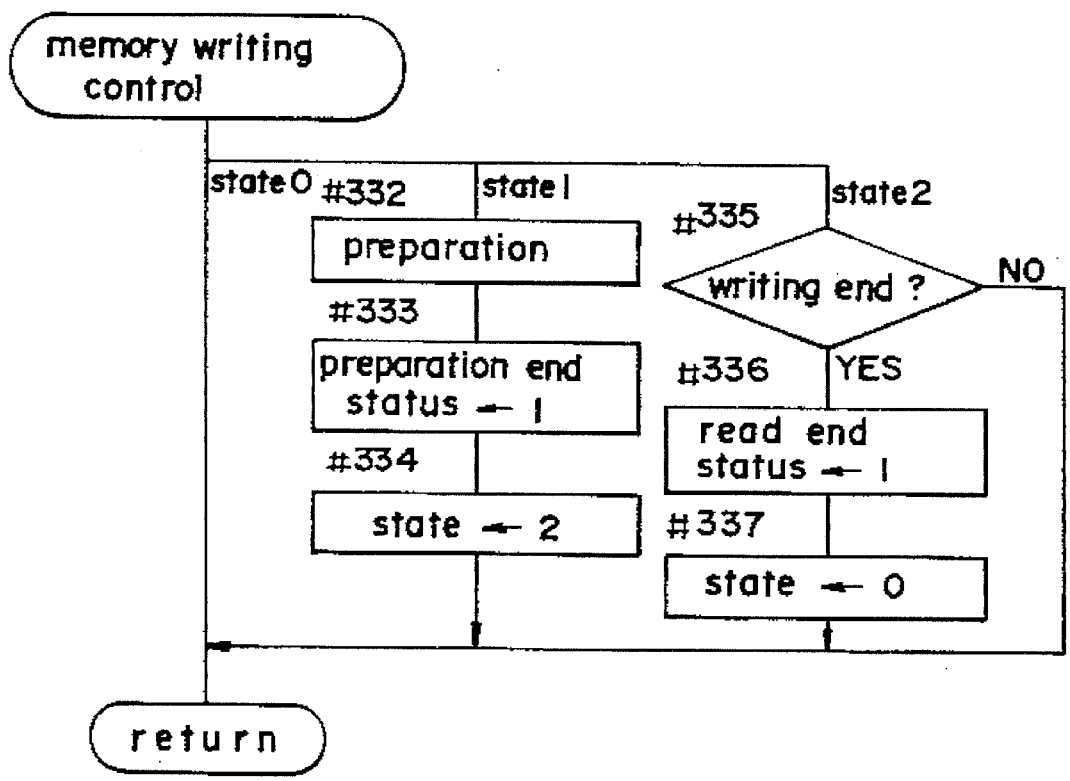
FIG. 25 is a flow chart showing the memory writing control process.

FIG. 25 is a flow chart showing the memory writing control process of step #64.

When the state is [1], the write starting address and XY lengths information for image memory 304 and the image process parameters are set (step #332), the memory preparation end status is set (step #333), and the state is set at [2] (step #334).

When the state is [2] and the writing of data to the image memory 304 ends (step #335: YES), the read end status is set (step #336), and the state is set at [0] (step #337).

Figure 26:
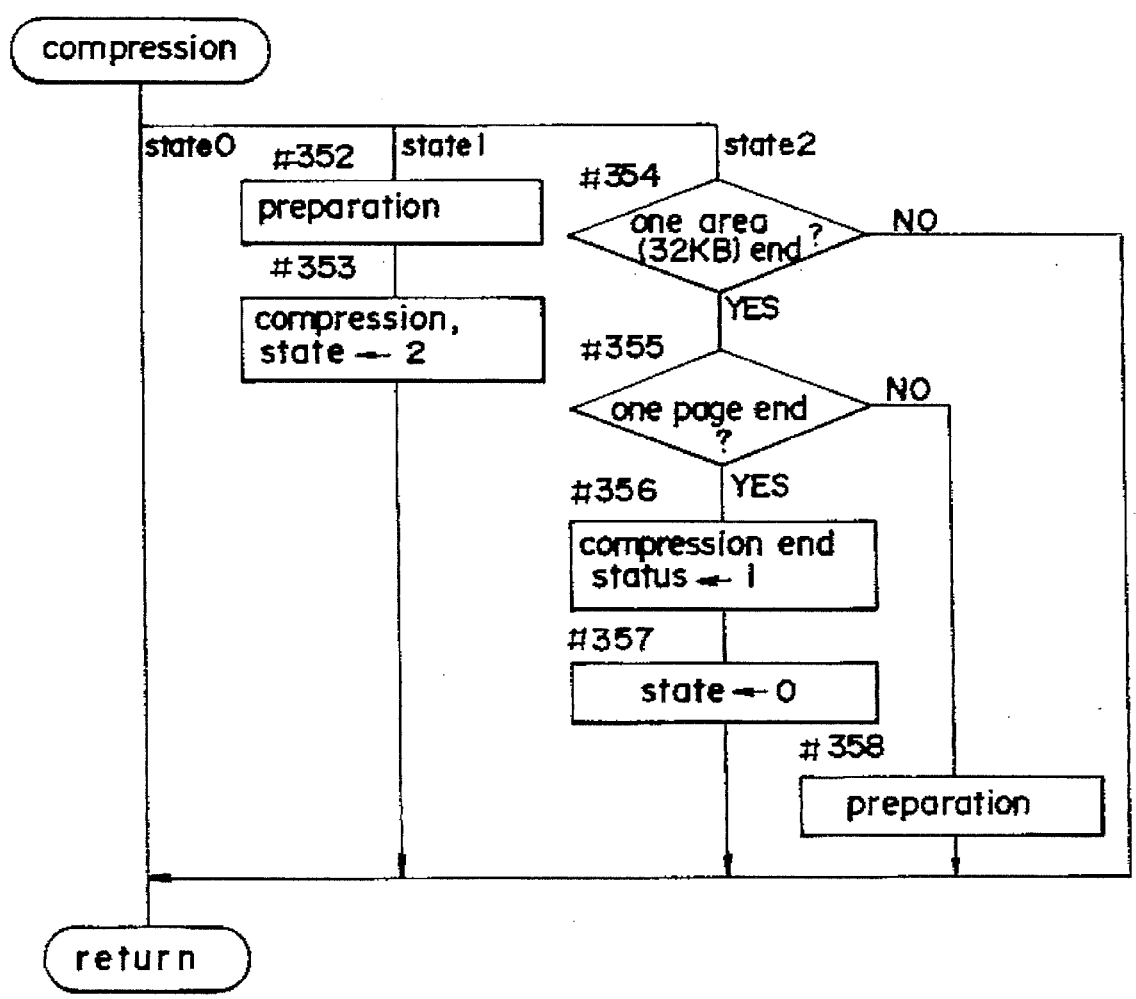
FIG. 26 is a flow chart showing the compression control process.

FIG. 26 is a flow chart showing the compression control process of step #65.

When the state is [1], the readout address and XY lengths information from image memory 304, write address to code memory 306, compression method and the like are established to set the compression process. The contents of the contents of the management table MT1 is changed in conjunction with the aforesaid settings (step #352), the compression process is started, and the state is set at [2] (step #353).

When the state is [2], settings are established in the same manner as described in step #352 each time the compression process ends for a single memory area of 32 kilobytes (step #358). When a one-page compression process ends, the compression end status is set (step #356), and the state is set at [0] (step #357).

Figure 27:
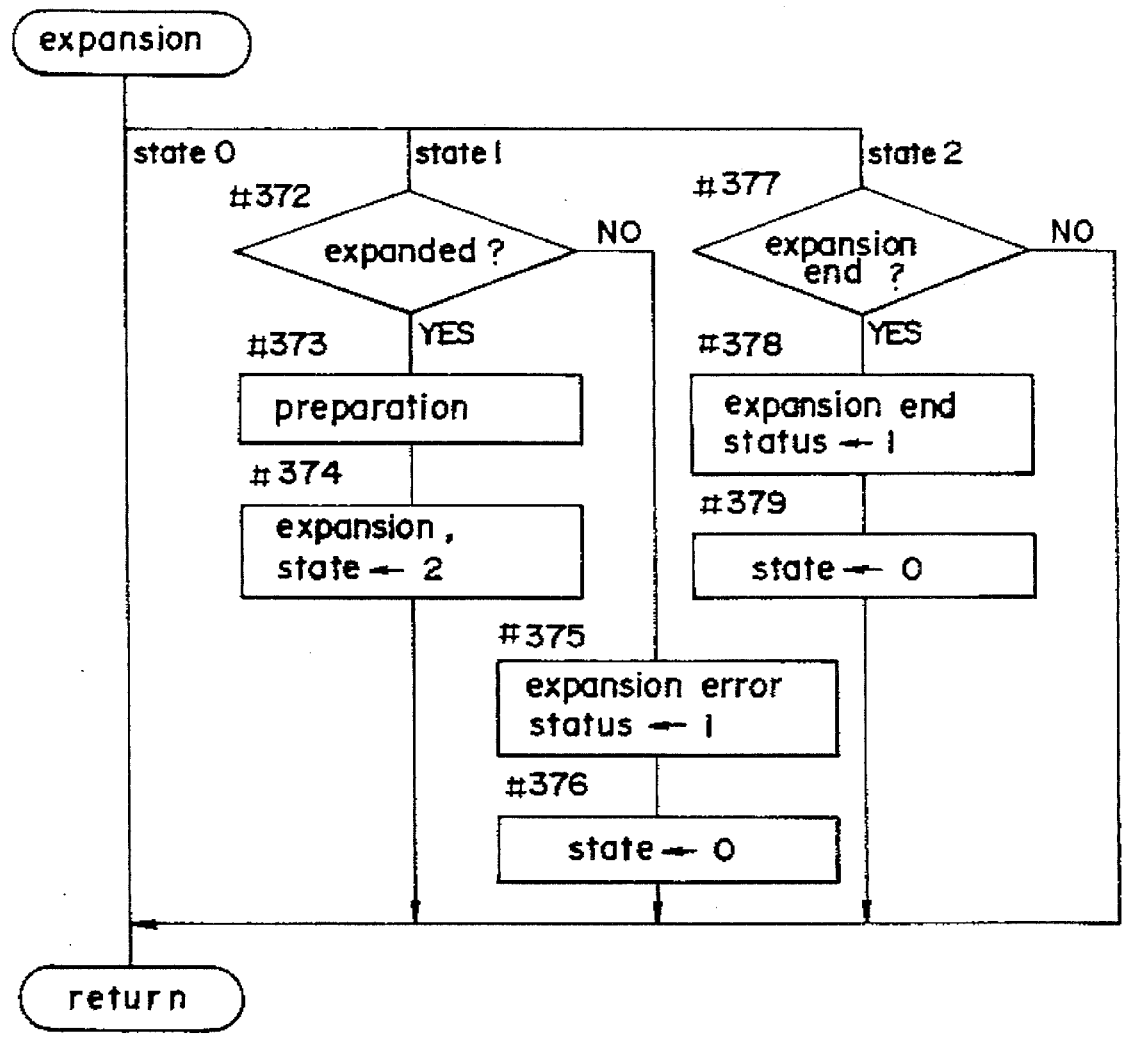
FIG. 27 is a flow chart showing the expansion control process.

FIG. 27 is a flow chart showing the expansion control process of step #66.

When the state is [1], a check is made to determine whether or not a specified page already has been compressed (step #372). If the reply to the query is YES, the setting of the memory unit section 30 are prepared (step #373), the expansion process is started, and the state is set at [2] (step #374).

If the reply to the query of step #372 is NO, the expansion error status is set (step #375), and the state is set at [0] (step #376).

When the state is [2] and the expansion process ends, the expansion end status is set (steps #377, #378), and the state is set at [0] (step #379).

Figure 28:
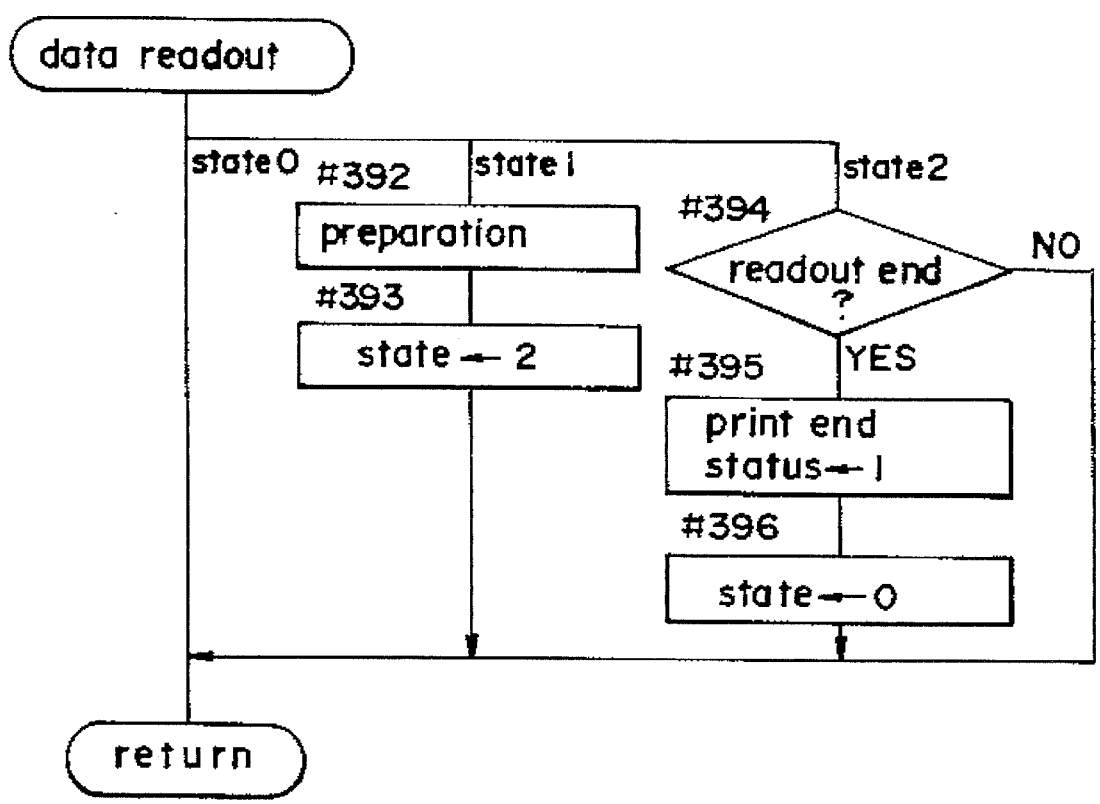
FIG. 28 is a flow chart showing the memory data readout control process.

FIG. 28 is a flow chart showing the data readout control process of step #67.

When the state is [1], the readout starting address for image memory 304, amount of data, and other parameters are set (step #392), and the state is set at [2] (step #393).

When the state is [2] and the readout of data from the image memory 304 ends (step #394: YES), the print end status is set (step #395), and the state is set at [0] (step #396).

Figure 29:
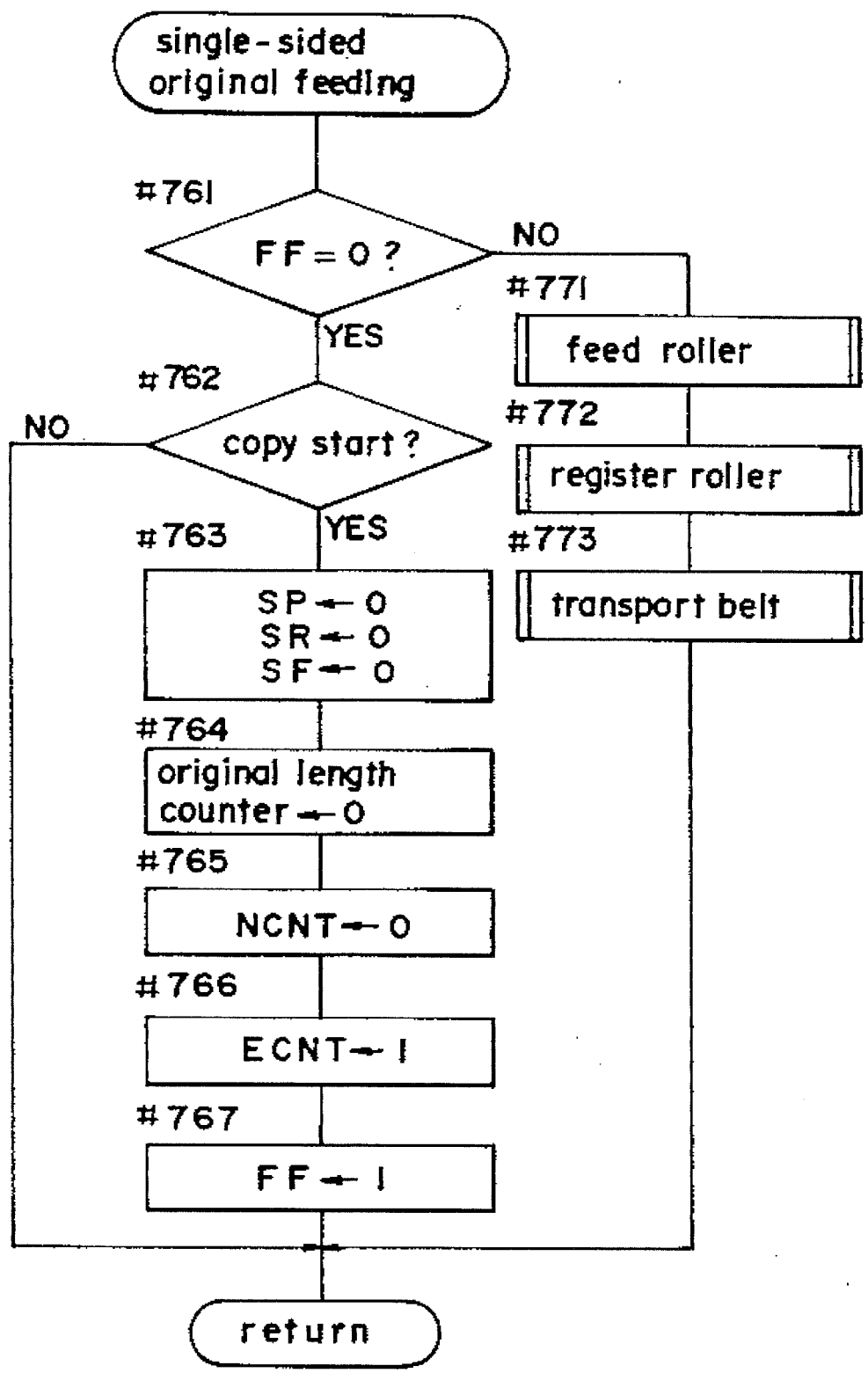
FIG. 29 is a flow chart showing the single-sided original feeding process.

FIG. 29 is a flow chart showing the single-sided original feeding process of step #74.

First, when the flag FF for indicating the state routine is set at [0] (step #761: YES), an operator initiated copy start is awaited (step #762), and the counters SP, SR, and SF are cleared (step #763). These counters SP, SR, and SF are used in the subroutines of steps #771, #772 and #773.

The original length counter is set at [0] to measure the original length Ld (step #764), the counter NCNT which indicates the number of originals presently fed to be read by a single scanning operation is set at [0] (step #765), the settable number of sheets ECNT is set at [1] (step #766), and the flag FF is set at [1] (step #767).

When the flag FF is set at [1] (step #761: NO), the original feed roller control process, register roller control process, and transport belt control process are executed (steps #771, #772, #773).

Figure 30A:
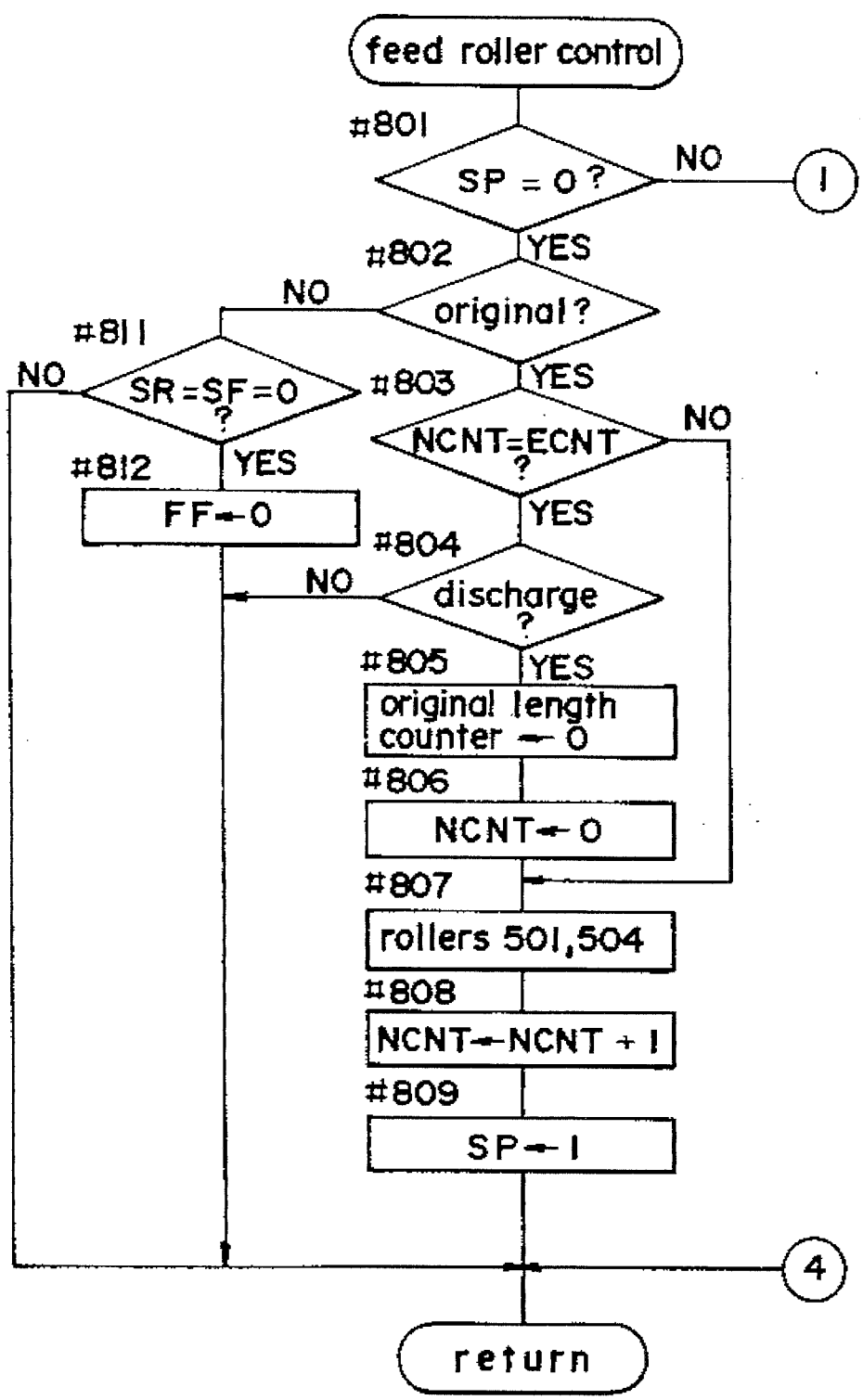
FIGS. 30a through 30c are a flow chart showing the document feed roller control process.
Figure 30:
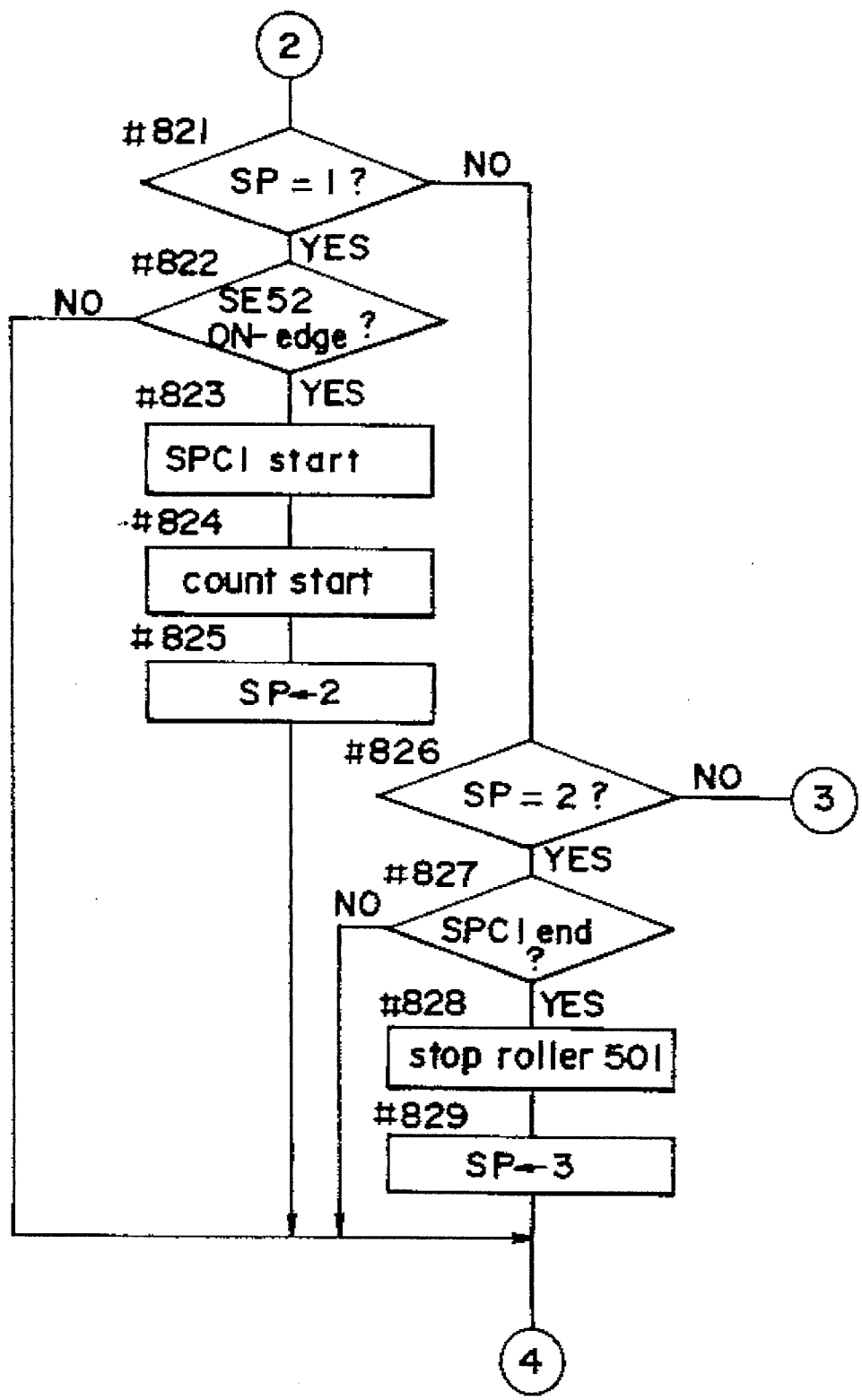
Figure 30C:
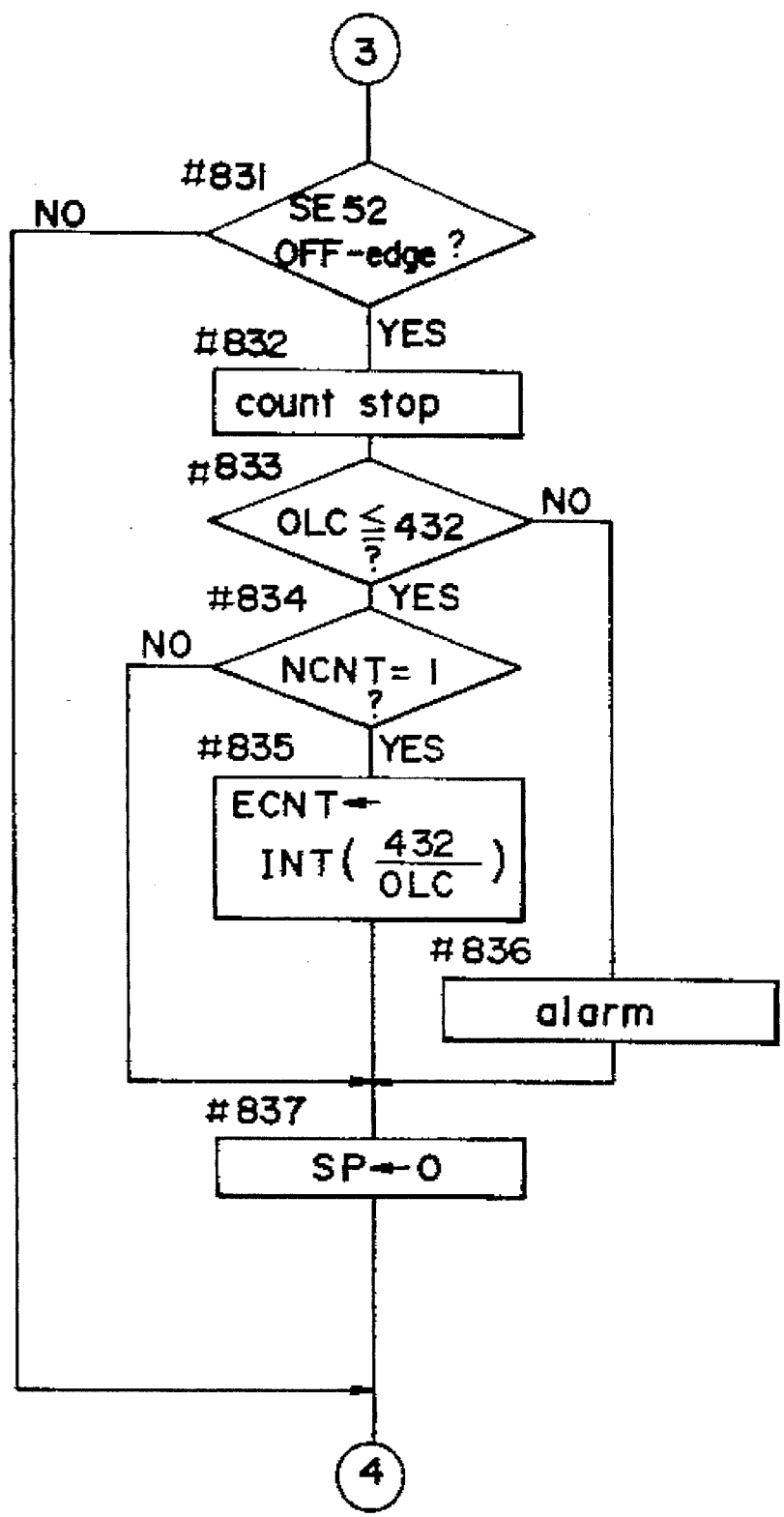

FIGS. 30a–30c are a flow chart showing the original feed roller control process of step #771. In this subroutine, transport of the original from the start of feeding to the register sensor SE51 is accomplished, and the number of continuously fed originals (number of settable sheets) is determined via the measured length of the originals. The value of the counter SP causes the routine to advance.

The document feeder 500 is driven by a motor not shown in the drawings, which supplies the drive force of the various rollers and transport belt and is transmitted via clutches. the amount of rotation of each roller, i.e., the amount of transport of the original, is obtained by calculating the amount of rotation of the aforesaid motor via the motor pulses. The motor pulse counter calculates the transport distance of the original.

When an original document is present (step #802: YES), the feed roller 501 and intermediate roller 504 are rotated (step #807), and the counter NCNT is incremented (step #808) until the value of the counter NCNT reaches the settable sheet number ECNT (until the reply to the query of step #803 is YES).

After the original sensor SE53 is turned ON (step #822: YES) and the original has been fed a fixed distance specified by the motor pulse counter SPC1 (step #827: YES), the feed roller 501 is stopped (step #828).

While the original sensor SE53 is turned ON (step #822: YES, step #831: NO), the original length counter performs an adding operation (step #824) to measure the length of the original. The measurement values are integrated in the original length counter except when said counter value is cleared in step #764 or step #805. The total length of the originals to be read in a single scan can be thus measured.

Accordingly, when the value of the original length counter OLC exceeds the effective reading length Lm (Lm=432 mm) (step #833: NO), an alarm is triggered which indicates that normal reading of the original is not possible, and the originals thus far fed are discharged (step #836).

In the case of a first original (step #834: YES), the settable number of sheets ECNT is determined from the measured length of the original (step #835). For example, when the original length is 120 mm, the following relationships obtain ECNT=INT($^{432}/_{120}$)=INT(3.6)=3, such that three originals can be set on the platen glass 18. The aforesaid value INT determines the integral part of the numeric value within the parenthesis.

After the value of the counter NCNT reaches the number of settable sheets ECNT via the feeding of the originals (step #803: YES), and the discharge of the originals set on the platen glass 18 starts (step #804: YES), the original length counter OLC and the counter NCNT are cleared (steps #805, #806), and the feeding of the next original begins.

When an original is not present (step #802: NO) and the counters SR and SF are both set at [0] (step #811: YES), the flag FF is set at [0] (step #812).

Figure 31:
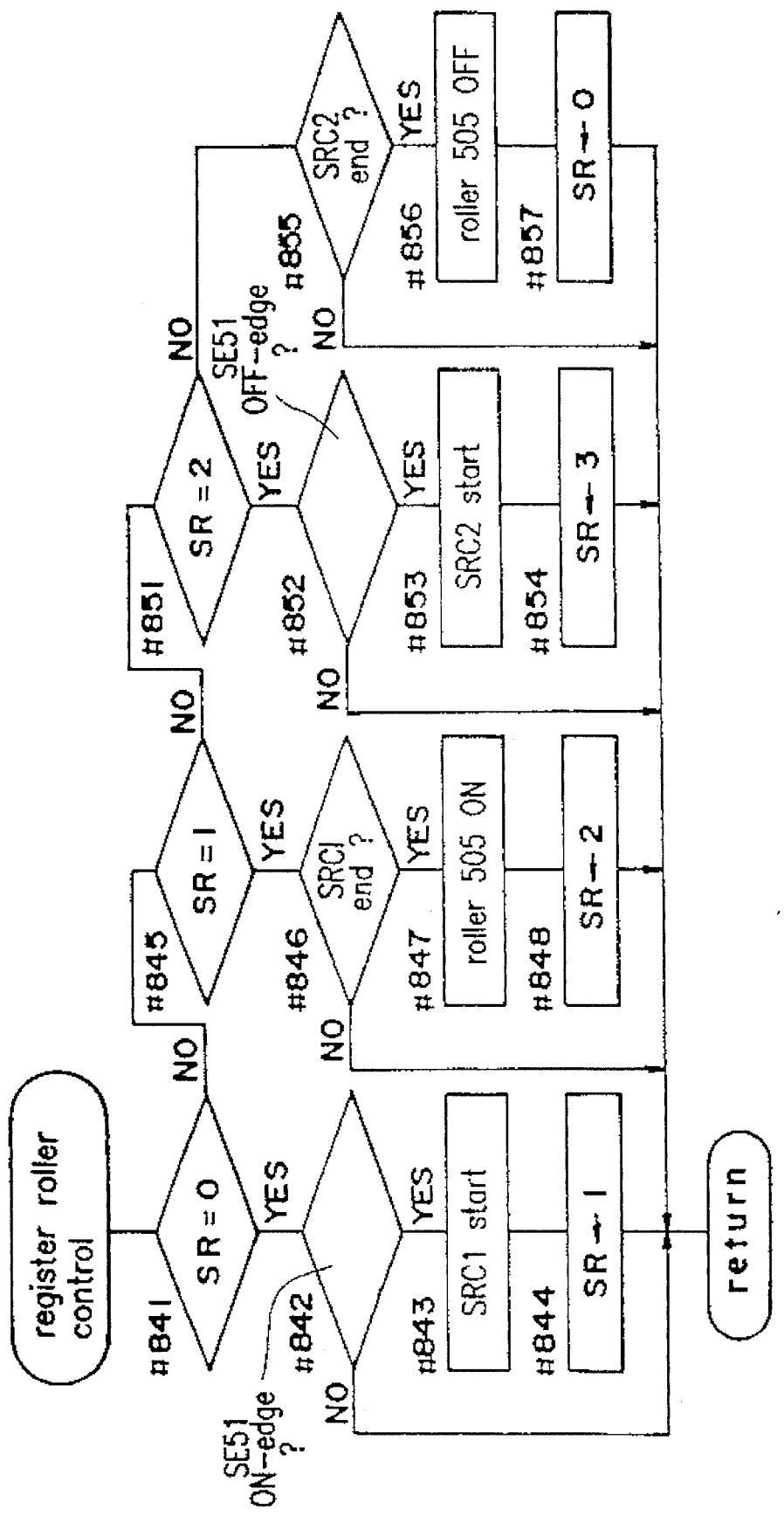
FIG. 31 is a flow chart showing the register roller control process.

FIG. 31 is a flow chart showing the register roller control process of step #772.

In this routine, the inclination is corrected for the original fed in the previously described original feed roller control process by means of controllably stopping the rotation of the register roller 505, and controlling the feeding the original to the transport belt 506. This process is advanced by the value of the counter SR.

Even after the leading end of the fed original reaches the register roller 505 and the register sensor SE51 is turned ON (step #842: YES), the feeding of said original continues with the leading end of said original in contact with the register roller 505, such that said original forms a loop. After feeding a distance specified by the motor pulse counter SRC1 (step #846: YES), the register roller is rotated (step #847).

After the original passes the register sensor SE51 (step #852: YES), the feeding of said original continues a distance specified by the motor pulse counter SRC2, and after the trailing end of the original passes the register roller 505 (step #855: YES), the rotation of the register roller 505 is stopped (step #856).

Figure 32:
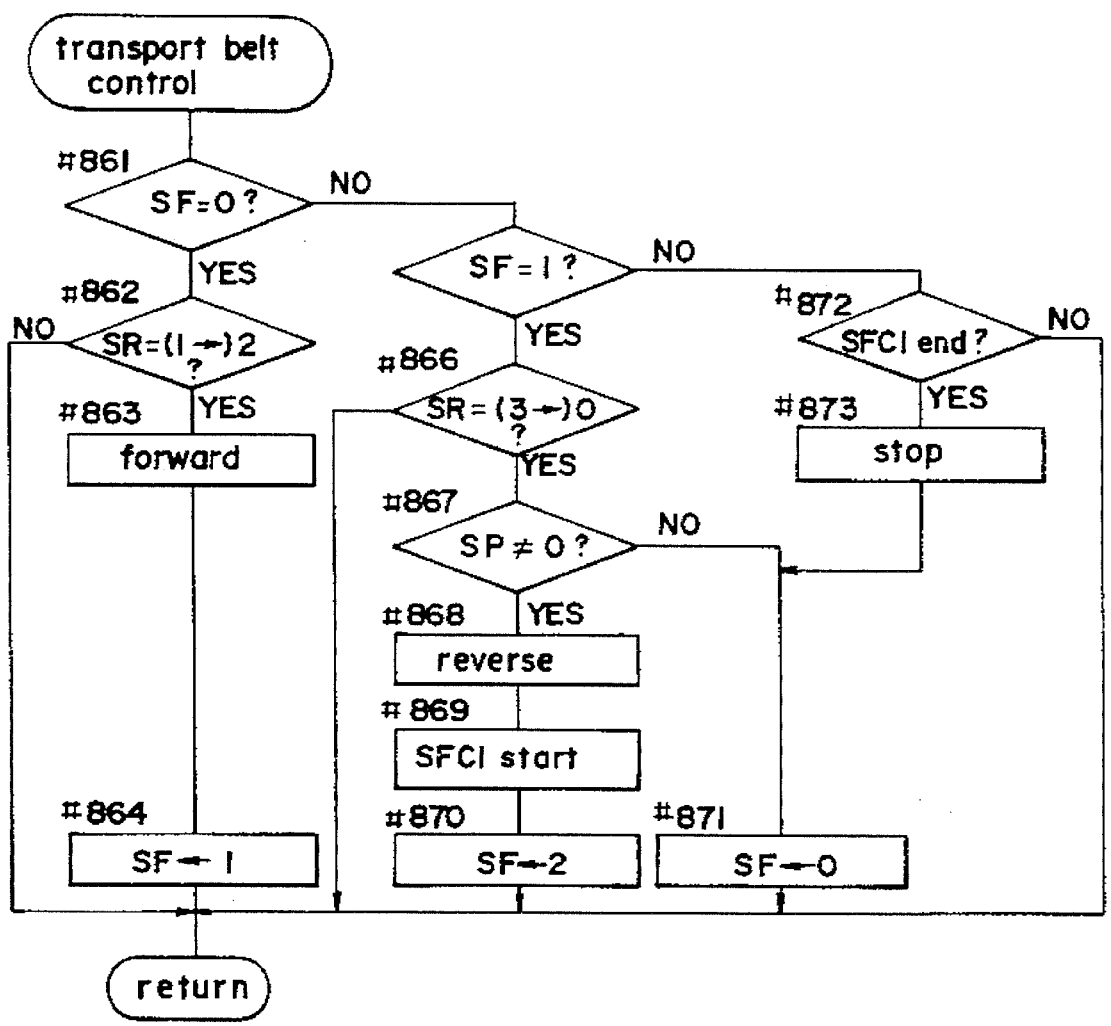
FIG. 32 is a flow chart showing the transport belt control process.

FIG. 32 is a flow chart showing the transport belt control process of step #773. In this routine, the original which has advanced past the register roller 505 is fed onto the platen glass 18. The original may be fed in the opposite direction as necessary to align the trailing end of said original so as to be in a state of contact with the register roller 505 and to wait in said condition in preparation for the feeding of a next continuously fed original. The positioning of the original on the platen glass 18 is accomplished through the original feeding process of step #76. This routine is advanced by the value of the counter SF.

When the value of the counter SR changes from [1] to [2] in the register roller control process, the rotation of the register roller 505 starts (step #862: YES), and the transport belt 506 is forward rotated to advance the original in a leftward direction (forward direction) (step #863).

Then, this process ends when the value of the counter SR changes from [3] to [0], the register roller 505 stops (step

866) and a next original is not fed, i.e., when the counter SR value is [0] (step #867: NO). Thereafter, the original is positioned on the platen glass 18 via the routine of the original feeding process so as to place said original at the reading position.

When a next original is fed (step #867: YES), the transport belt 506 is reversely rotated (step #868) to move the original in the opposite direction only a distance specified by the motor pulse counter SFC1 (steps #869, #872, #873). At this time, the trailing end of the original is in a state of contact with the register roller 505. When the next original reaches the register roller 505, this next original is also positioned on the platen glass 18 with the first original via the process step #863 and subsequent steps of this routine.

Thus, in the previously described embodiment of the copying apparatus 1, the memory mode (write) and memory mode (read) operations can be executed independently and in parallel via the hardware circuit blocks and software of the control section 100 of memory unit section 30. Furthermore, a plurality of originals can be copied at faster speed by switchably controlling the direct mode and the memory mode during a copying operation and executing a direct/memory (mix) mode, thereby improving the productivity of the copying apparatus.

In the previously described embodiment, if the image memory 304 provided in the memory unit section 30 is capable of executing writing operations and reading operations independently and simultaneously, a plurality of memory chips need not be provided, inasmuch as a single memory chip divided into memory areas may be used.

Although the settable number of originals ECNT is dynamically calculated in the autoscan mode in the embodiment describe above, the number of settable originals on the platen glass 18 may also be manually set. In such a case, when there is a possibility of damaging the originals in the placement operation, the operator may optionally reduce the number of set originals to reflect a change from a speed priority to an original conservation priority.

While, in the aforesaid embodiment, the pulse number is counted during the passage of the original past the sensor SE53 to calculate the length of the original, it is to be noted that other various types of sensors or mechanisms may be used to measure the length of said originals. Furthermore, the length of the original may be detected via set sizes input through the operation panel OP. In addition, an image reader unit incorporating a sealed type image sensor may be alternatively used in place of the scanner 19.

Furthermore, the construction of the circuits used in the control section 100, contents of the processes implemented by the various CPUs 101–108, process apportionment, and software construction implemented in the memory unit section 30, scanning system 10, original feeder 500, and the construction of each part of the copying apparatus 1 may be modified insofar as such modifications do not depart from the scope of the present invention.

What is claimed is:

1. An image reading apparatus comprising:

a platen;

a tray which supports a plurality of originals thereon;

feeding means for feeding originals from the tray to the platen and setting them side by side on the platen;

reading means for reading images of the originals set on the platen and generating image data;

detecting means for detecting a length of the original;

means for calculating a maximum number of originals that will fit on the platen side by side based on the length detected by the detecting means;

feed control means for controlling said feeding means such that said feeding means feeds and sets the calculated number of originals on the platen side by side;

scan control means for controlling said reading means such that said image reading means reads the originals and generates image data corresponding to them by a single scan; and storage means for storing said image data generated by said image reading means.

2. The image reading apparatus as claimed in claim 1, further comprising:

identification data generating means for generating identification data corresponding to the originals read by the reading means; and data managing means for managing the data stored in the storage means by use of the identification data.

3. The image reading apparatus as claimed in claim 2, wherein said data managing means includes a managing table which provides a relationship between memory areas and the stored contents in the memory.

4. The image reading apparatus as claimed in claim 3, wherein said managing table is produced when said the image data is stored.

5. The image reading apparatus as claimed in claim 4, further comprising:

data reading means for reading out the image data stored in the memory with reference to the managing table.

6. The image reading apparatus as claimed in claim 1, further comprising:

input means for manually inputting the number of originals to be set on the platen.

7. A method of reading images by an image reading apparatus which supports a plurality of originals on a tray, feeds originals from the tray to a platen and reads images of the original, comprising the steps of:

detecting a length of the original;

calculating a maximum number of originals that will fit on the platen side by side based on the detected length;

feeding the calculated number of originals from the tray and setting the calculated number of originals side by side on the platen; and reading images of the calculated number of originals set on the platen and generating image data corresponding to the images.

8. The method as claimed in claim 7, further comprising:

storing the image data into a memory.

9. The method as claimed in claim 8, further comprising:

generating a plurality of identification data corresponding to the originals on the platen; and forming a management table which provides a relationship between memory areas and the image data by use of said identification data.

10. The method as claimed in claim 9, further comprising:

reading out the image data from the memory with referring to the management table; and forming an image on a copy sheet corresponding to the data read out from the memory.

11. The method as claimed in claim 7, further comprising:

compressing the image data; and storing the compressed image data into a memory.

12. The method as claimed in claim 11, further comprising:

generating a plurality of identification data corresponding to the originals on the platen; and forming a management table which provides a relationship between memory areas and the compressed image data by use of said identification data.

13. The method as claimed in claim 12, further comprising:

reading out the compressed image data from the memory with reference to the management table;

expanding the compressed image data; and forming an image on a copy sheet corresponding to the expanded image data.

14. A method of reading images by an image reading apparatus which supports a plurality of originals on a tray, feeds originals from the tray to a platen and reads images of the originals, comprising the steps of:

feeding a first original from the tray to the platen;

detecting a length of the first original;

calculating a maximum number (N) of originals that will fit on the platen based on the detected length;

feeding (N–1) sheets of originals succeeding to the first original from the tray;

setting said first original and the succeeding (N–1) sheets of originals side by side on the platen; and reading images of the N sheets of originals set on the platen and generating image data corresponding to the images.

15. The method claimed in claim 14, further comprising:

compressing the image data to produce compressed image data; and storing the compressed image data in a memory.

16. The method as claimed in claim 15, further comprising:

reading out the compressed image data from the memory;

expanding the read out compressed image data to produce expanded image data; and feeding the expanded image data to a image forming device.

17. In an image forming apparatus which has an image reading device and an image forming device, a method comprising:

placing a plurality of originals on a platen side by side in a predetermined order;

operating said image reading device and generating sequentially a plurality of image data each of which corresponds to a particular one of said originals;

feeding one of said image data to the image forming device while feeding another image data to a memory;

forming a first image on a copy sheet in response to said image data fed to the image forming device;

storing the another image data in the memory;

reading out one of the another image data stored in the memory; and feeding the read out image data to the image forming device after said first image forming device has formed the first image.

18. The method as claimed in claim 17, further comprising:

detecting a length of the originals; and determining a number of originals to be placed on the platen side by side based on the detected length.

19. In an image forming apparatus which has an image reading device and an image forming device, a method comprising:

feeding a first and second original to a platen with an automatic document feeder;

placing the first and the second original on the platen side by side;

operating said image reading device and generating sequentially a first image data corresponding to the first original and a second image data corresponding to the second original in this order;

feeding said first image data to the image forming device while feeding the second image data to a memory;

forming a first image on a copy sheet in response to said first image data;

storing the second image data in the memory;

reading out the second image data stored in the memory; and feeding the second image data read out from the memory to the image forming device after said image forming device has formed the first image.

20. The method as claimed in claim 19, further comprising:

compressing the second data before storing the second data into the memory; and expanding the second data read out from the memory before feeding the second data to the image forming device.

21. The image reading apparatus as claimed in claim 1, wherein the number of originals is a maximum number of originals that will fit on the platen.

22. The method as claimed in claim 7, wherein the number of originals is a maximum number of originals that will fit on the platen.

23. The method as claimed in claim 14, wherein the number (N) of originals is a maximum number of originals that will fit on the platen.

* * * * *